United States Patent [19]
Nii

[11] Patent Number: 5,659,765
[45] Date of Patent: Aug. 19, 1997

[54] MACHINE TRANSLATION SYSTEM

[75] Inventor: Seiji Nii, Ibaraki-ken, Japan

[73] Assignee: Toppan Printing Co., Ltd., Tokyo, Japan

[21] Appl. No.: 403,958

[22] Filed: Mar. 14, 1995

[30] Foreign Application Priority Data

| Mar. 15, 1994 | [JP] | Japan | 6-070135 |
| Mar. 15, 1994 | [JP] | Japan | 6-070136 |
| Mar. 15, 1994 | [JP] | Japan | 6-070137 |
| Mar. 15, 1994 | [JP] | Japan | 6-070138 |

[51] Int. Cl.$^6$ .................................................. G06F 3/14
[52] U.S. Cl. ........................... 395/754; 395/753; 395/757
[58] Field of Search ............................. 395/752, 753, 395/754, 757, 760, 793, 794

[56] References Cited

U.S. PATENT DOCUMENTS

| 4,831,529 | 5/1989 | Miike et al. | 395/760 |
| 5,373,442 | 12/1994 | Kutsumi et al. | 395/755 |
| 5,442,546 | 8/1995 | Kaji et al. | 395/754 |

OTHER PUBLICATIONS

Artificial and Human Intelligence,"A Framework of a Mechanical Translation . . . Analogy Principle," Elsevier Science Publications, pp. 173–180, 1984.

"Example–Based Machine Translation," Satoshi Sato, Kyoto University, Sep. 1991.

*Primary Examiner*—Jeffery Hofsass
*Assistant Examiner*—Andrew Hill
*Attorney, Agent, or Firm*—Staas & Halsey

[57] ABSTRACT

A machine translation system includes a database for storing various information, database management section for performing database management, a bilingual correspondence data record subsystem for performing recording/learning processing of translation examples, a translation subsystem for performing translation processing, and dictionary management utilities for performing dictionary management and database transmission/reception processing. The bilingual correspondence data recording section records English and Japanese bilingual correspondences by using English and Japanese sentences stored in the same file or different files. The recorded bilingual correspondences are linked in units of parts by a bilingual correspondence learning section. In performing translation, an English-to-Japanese translation section and the like generate a translation of an original sentence as a translation target by using parts and the like which have undergone learning/recording processing. The dictionary management utilities perform database transmission/reception processing to/from another machine translation system.

21 Claims, 37 Drawing Sheets

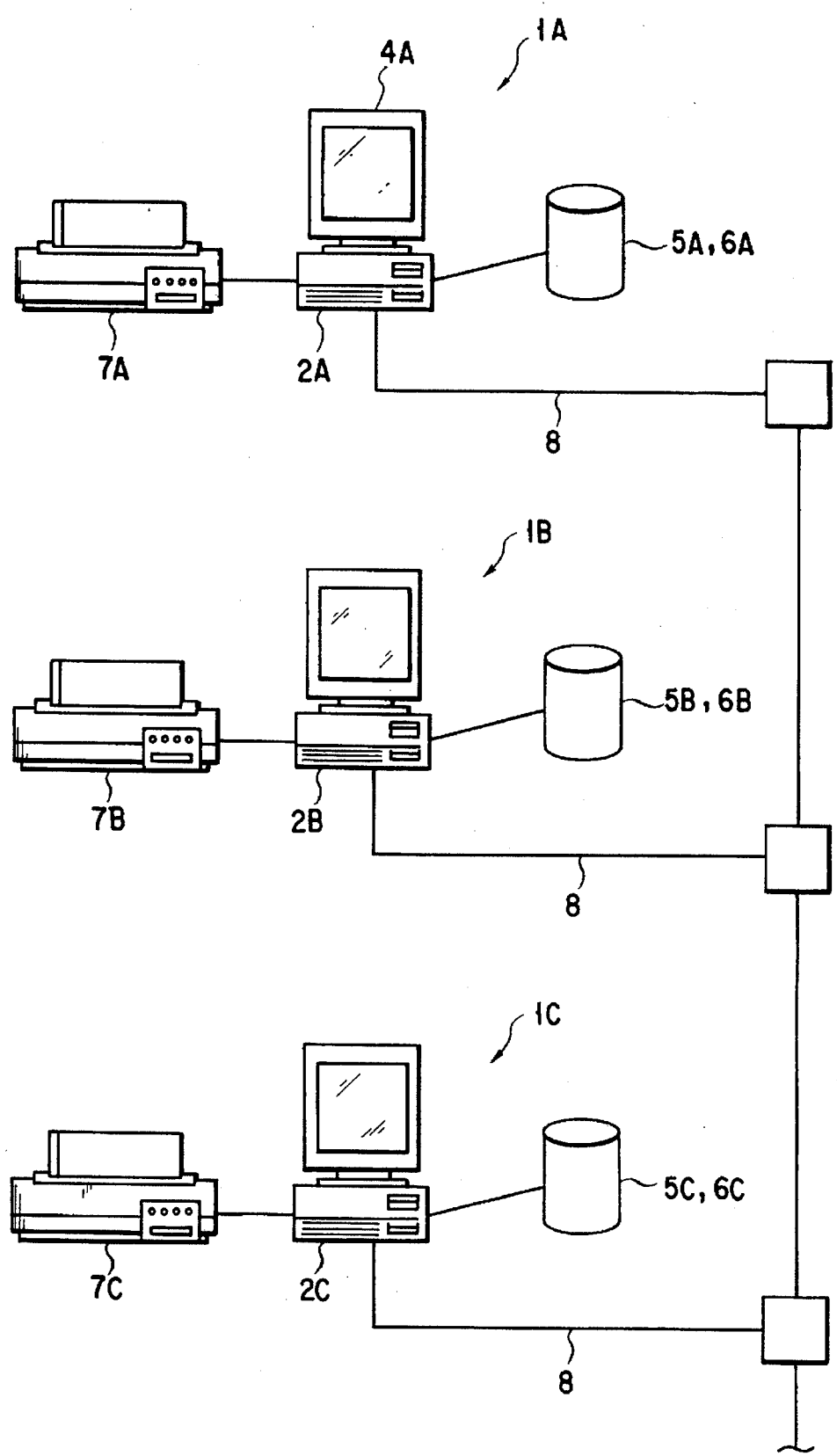
F I G. 4

RECORDING OF TRANSLATED SENTENCE h HELP

31ST SENTENCE —105

ENGLISH SENTENCE

Selectively plated with minimum of 150 micro inches of silver on the bonding area, measured as in section 6.3.1 —100

JAPANESE SENTENCE 6.3.1の項の計測方法により、ボンディングされる部分に銀メッキが最低
150 マイクロインチの厚さで部分メッキが施されていること。 —101
<6.3.1 NO KOUNO KEISOKUHOUHOU NI YORI 、BONDYINGU SARERU BUBUNNI
GINMEKKIGA SAITEI 150 MAIKUROINCHI NO ATUSADE BUBUNMEKKIGA
HODOKOSARETEIRUKOTO>

<COMMAND>
NON-RECORDED ENGLISH WORD: —103
NON-RECORDED JAPANESE WORD: —104

RECORDING OK? [Y/N]

RECORDING OF TRANSLATED SENTENCE DATABASE
RECORDING OF TRANSLATED SENTENCE NUMBER=31   JAPANESE SENTENCE NUMBER=31   RECORDING OF TRANSLATED SENTENCE IN PROGRESS ~107

H HELP   ENGLISH SENTENCE NUMBER=31 ~106

31 Selectively plated with minimum of 150 micro inches of silver on the bonding area, measured as in section 6.3.1. ~109

6.3.1 の項の計算方法により、ボンディングされる部分に銀メッキが最低150 マイクロインチの厚さで部分メッキが施されていること。
<6.3.1 NO KOUNO KEISOKUHOUHOU NI YORI, BONDYINGU SARERU BUBUNNI GINMEKKIGA SAITEI 150 MAIKUROINCHI NO ATUSADEBUBUNMEKKIGA HODOKOSARETEIRUKOTO> ~110

32 Plating shall be uniform in appearance, smooth, bright in color, free from blisters, peeling, nodules, discoloration, contaminants and burn marks.

メッキは、見た目に均一で、滑らかで、光沢があり、ブリスター、剥離、こぶ、変色、不純物、ムラがあったりしてはならない。
<MEKKIWA, MITAMENI KINITUDE, NAMERAKADE, KOUTAKUGAARI, BURISUTA, HAKURI, KOBU, HENSYOKU, HUZYUNBUTU, MURA GA ATTARISITEWA NARANAI>

33 There shall be no exposed base metal.

またベースの金属が露出してはならない。
<MATA BESU NO KINZOKUGA ROSYUTU SITEWA NARANAI>

34 Copper strike under plating shall be uniform in appearance.

メッキの下の銅の地金は、見た目に均一で、滑らかで、カップリスターや、剥離、変色、不純物があってはならない。
<MEKKINO SITANO DOUNO JIGANEWA MITAMENI KINITUDE NAMERAKADE, KATU BURISUTA YA, HAKURI, HENSYOKU, HUZYUNBUTU GA ATTEWA NARANAI>

DO YOU RECORD TRANSLATED SENTENCE?   (y/n/q/c/k/r/p/g/t/b/h/l/d/c) ~108

LEARNING OF 3646TH SENTENCE IN PROGRESS. BILINGUAL CORRESPONDENCE LEARNING

```
3646  Selectively plated with minimum              6.3.1 の項の計測方法によりボンディングされる部分に銀メッキが最低
      of 150 micro inches of silver on             150 マイクロインチの厚さで部分メッキが施されていること。
      the bonding area, measured as in             《6.3.1 NO KOUNO KEISOKUHOUHOU NI YORI, BONDYINGU SARERU BUBUNNI
111   section 6.3.1.                               GINMEKKIGA SAITEI 150 MAIKUROINCHI NO ATUSADE BUBUNMEKKIGA
                                                   HODOKOSARETEIRUKOTO》
                                                                                                          112
PARTS LINK INFORMATION                    113
《《1:Selectively 2:plated 18:部分 19:メッキが 20:施さ    21:れ   で  22:いる 23:こと》》
                          《BUBUN》《MEKKIGA》《HODOKOSA》   《RE  TE》 《IRU》  《KOTO》

《《3:with * * * *》》
《《4:minimum 5:of 12:最低》》
                        《SAITEI》

《《6:150 13:1 5 0》》
《《7:micro 8:inches 14:マイクロ 15:インチの》》
                              《MAIKURO》《INCHINO》

《《9:of silver 10:銀》》
                  《GIN》

《《10:on 11:the bonding area 7:ボンディングさ  8:れる  9:部分に》》
                                        《BONDYINGUSA》《RERU》《BUBUNNI》

《《13:measured * * * *》》
《《14:as * * * *》》
《《15:in section 2:項の》》
                     《KOUNO》

《《16:6.3.1 1:6.3.1の》》
                    《6.3.1 NO》

LINKING OK?   (y/n)n  ── 114
DO YOU WANT TO OUTPUT PARTS LINK LIST?  (y/n)n  ── 115
```

FIG. 8A

ENGLISH PARTS INFORMATION ---116
1:Selectively 2:plated 3:with 4:minimum 5:of 6:150 7:micro 8:Inches 9:of silver
10:on 11:the bonding area 12:, 13:measured 14:as 15:in section  16:6.3.1

JAPANESE PARTS INFORMATION ---117
1:6.3.1 の 2: 項の 3: 計測    4:方法 5: に   より 6:., 7:ボンディング さ 8:れる    9:部分に 10:銀 11:メッキ     が
   〈6.3.1 NO〉 〈KOUNO〉 〈KEISOKU〉 〈HOUHOU〉〈NI YORI〉     〈BONDYINGUSA〉       〈RERU〉  〈BUBUNNI〉 〈GIN〉 〈MEKKI  GA〉
12: 最低 13:150 14: マイクロ 15:インチの 16:厚 さ 17:で 18:部分 19:メッキが 20:施さ   〈HODOKOSA〉〈RE  TE〉
   〈SAITEI〉       〈MAIKURO〉  〈INCHINO〉 〈ATU SA〉 〈DE〉 〈BUBUN〉 〈MEKKIGA〉
22: いる 23: こと 24:。
   〈IRU〉  〈KOTO〉

ENGLISH LINK    :3          ---118
JAPANESE LINK :16 17
ENGLISH LINK    :13 14
JAPANESE LINK :3 4 5        ---119
ENGLISH LINK    :

FIG. 8B

ENGLISH MORPHEMES
[in:PREPOSITION] [the:ARTICLE] [beginning:NOUN] [God:NOUN] [created:TRANSITIVE VERB] [the:ARTICLE] 〜121
[heavens:NOUN] [and:CONJUNCTION] [the:ARTICLE] [earth:NOUN]

JAPANESE MORPHEMES
[初め:NOUN] [に] [、] [神:NOUN] [は] [天地:NOUN] [を] [創造さ:NOUN+SA] [れ] [た] 〜122
⟨HAJIME⟩ ⟨NI⟩       ⟨KAMI⟩ ⟨WA⟩ ⟨TENCHI⟩ ⟨WO⟩ ⟨SOUZOUSA⟩ ⟨RE⟩ ⟨TA⟩

WORD LINK INFORMATION
[3:NOUN God :3] [4:TRANSITIVE VERB created :7] [3:NOUN神 :3] [7:NOUN+SA 創造さ :4] 〜123
⟨KAMI⟩ ⟨SOUZOUSA⟩

ENGLISH PARTS INFORMATION
1:In the beginning 2:God 3: created 4:the heavens 5:and 6:the earth 〜124

JAPANESE PARTS INFORMATION
1:初め に 3:、 4:神 は 5:天地 を 6:創造さ 7:れ 8:た 〜125
⟨HAJIME NI⟩   ⟨KAMI WA⟩ ⟨TENCHI WO⟩ ⟨SOUZOUSA⟩⟨RE⟩ ⟨TA⟩

PARTS LINK INFORMATION
⟨⟨1:In the beginning 1:初め に⟩⟩ 〜126
⟨HAJIME NI⟩

⟨⟨2:God 4:神 は⟩⟩
⟨KAMI WA⟩

⟨⟨3:created 6:創造さ 7:れ 8:た⟩⟩
⟨SOUZOUSA⟩⟨RE⟩ ⟨TA⟩

⟨⟨4:the heavens 5:and 6:the earth 5:天地 を⟩⟩
⟨TENCHI WO⟩

FIG. 10

<ORIGINAL SENTENCE>      131

ボンディングされる部分に最低１００マイクロインチの厚さで銀による部分メッキが施されていること。
<BONDYINGU SARERU BUBUNNI SAITEI 100 MAIKUROINCHI NO ATUSADE GINNIYORU BUBUNMEKKI GA HODOKOSARETEIRUKOTO>

<RESULT OF SIMILARITY CALCULATION-MOST SIMILAR SENTENCE→3646TH SENTENCE>      132

Selectively plated with minimum of 150 micro inches of silver on the bonding area, measured as in section 6.3.1.

6.3.1の項の計測方法により、ボンディングされる部分に銀メッキが最低150マイクロインチの厚さで部分メッキが施されていること。
<6.3.1 NO KOUNO KEISOKUHOUHOU NI YORI, BONDYINGU SARERU BUBUNNI GINMEKKIGA SAITEI 150 MAIKUROINCHI NO ATUSADE BUBUNMEKKIGA HODOKOSARETEIRUKOTO>

133

<PARTS LINK INFORMATION OF 3646TH SENTENCE>      134

| English | | Japanese |
|---|---|---|
| Selectively plated | <----> | 部分 メッキが 施さ れて いる こと <BUBUN MEKKIGA HODOKOSA RE TE IRU KOTO> |
| with | <----> | 厚さ で <ATUSA DE> |
| minimum of | <----> | 最低 <SAITEI> |
| 150 | <----> | 150 |
| micro inches | <----> | マイクロ インチの <MAIKURO INTI NO> |
| of silver | <----> | 銀 <GIN> |
| on the bonding area | <----> | ボンディングさ れる 部分に <BONDYINGUSA RERU BUBUNNI> |
| measured as | <----> | 計測 方法 により <KEISOKU HOUHOU NIYORI> |
| in section | <----> | 項の <KOUNO> |
| 6.3.1 | <----> | 6.3.1 の <NO> |

FIG. 11A

```
<PARTS LINK WHICH CAN BE USED>                    ─135
┌─────────────────────────────────────────────────────────────────┐
│ Selectively plated  <---->  部分 メッキが 施さ  れ て いる こと │
│                              <BUBUN MEKKIGA HODOKOSA RE TE IRU  KOTO│
│ with                <---->  厚さ で                             │
│                              <ATUSA DE>                         │
│ minimum of          <---->  最低                                │
│                              <SAITEI>                           │
│ 150                 <****>  150                                 │
│ micro inches        <---->  マイクロ インチの                   │
│                              <MAIKURO   INCHI NO>               │
│ of silver           <---->  銀                                  │
│                              <GIN>                              │
│ on the bonding area <---->  ボンディングさ れる 部分に          │
│                              <BONDYINGUSA    RERU  BUBUNNI>     │
│ measured as         <****>  計測  方法  により                  │
│                              <KEISOKU HOUHOU  NIYORI>           │
│ in section          <****>  項の                                │
│                              <KOUNO>                            │
│ 6.3.1               <****>  6.3.1 の                            │
│                              <NO>                               │
└─────────────────────────────────────────────────────────────────┘

<TRANSLATED SENTENCE>                             ─136
┌─────────────────────────────────────────────────────────────────┐
│ Selectively plated with minimum of 100 micro inches of          │
│ silver on the bonding area.                                     │
└─────────────────────────────────────────────────────────────────┘
```

F I G. 11B

1 Approved engineering change notice on file in document control.

承認済み技術変更の通知は、
文書管理のファイルにあります
〈SYOUNINZUMI GIJUTUHENKOU NO TUUCHI WA, BUNSYOKANRINO FAIRU NI ARIMASU〉

2 To establish a standard procedure for incoming inspection of plastic frames.

◇プラスチック・フレーム の で 受け入れ検査 標準 手続き を 確立する
◇〈PURASUCHIKKU HUREMU NO DE UKEIRE KENSA HYOUZYUN TETUZUKI WO KAKURITU SURU〉

3 Traceability No. will be assigned to each lot by incoming QC prior to inspection.

◇検査 に 先立ち 番の 受け入れ 品質係り に より ロット 毎の 履歴 を 明確に する ため に つける。
◇〈KENSA NI SAKIDACHI BANNO UKEIRE HINSITUKAKARI NI YORI ROTTO GOTONO RIREKI WO MEIKAKUNI SURU TAME NI TUKERU〉

FIG. 12

1 承認済み技術変更の通知は、
  文書管理のファイルにあります。
  〈SYOUNINZUMI GIZYUTUHENKOU NO
  TUUCHI WA, BUNSYOKANRINO
  FAIRU NI ARIMASU〉

1 Approved engineering change
  notice on file in document
  control.

2 プラスチック・フレームの
  受け入れ検査の
  標準手続きを確立する
  〈PURASUCHIKKU HUREMU NO
  UKEIRE KENSA NO HYOUZYUN
  TETUZUKI WO KAKURITU SURU〉

2 To establish a standard
  procedure for incoming
  inspection of plastic frames.

3 検査に先立ち、
  受け入れ品質係りにより、
  ロット毎の履歴を明確に
  するためにIQC NO. をつける。
  〈KENSANI SAKIDATI
  UKEIREHINSITUKAKARI NI YORI
  ROTTO GOTO NO RIREKI WO
  MEIKAKU NI SURUTAMENI
  IQC NO. WO TUKERU〉

3 Traceability IQC # will be
  assigned to each lot by
  incoming prior to
  inspection tube.

FIG. 13

<ORIGINAL SENTENCE>
When I fell into the river he came to my aid.

<RESULT OF SIMILARITY CALCULATION-MOST SIMILAR SENTENCE→1917TH SENTENCE>
When it came to voting, he abstained.
いざ投票というとき彼は棄権した。
<IZA TOUHYU TO IUTOKI KAREWA KIKENSITA>

<PARTS LINK INFORMATION OF 1917TH SENTENCE>

| When | <----> | とき <TOKI> |
| it came | <----> | という <TOIU> |
| to voting | <----> | 投票 <TOUHYOU> |
| he | <----> | 彼は <KARE WA> |
| abstained | <----> | 棄権した <KIKENSI TA> |

<PARTS LINKS WHICH CAN USED FOR 1917TH SENTENCE>

| When | <----> | とき <TOKI> |
| it came | <****> | という <TOIU> |
| to voting | <****> | 投票 <TOUHYOU> |
| he | <----> | 彼は <KARE WA> |
| abstained | <****> | 棄権した <KIKENSI TA> |

<PARTS WHICH CORRESPOND TO NO PARTS IN ORIGINAL SENTENCE: PARTS IN "( )">
When (I fell into the river) he (came to my aid.)

FIG. 15A

⟨SECOND MOST SIMILAR SENTENCE
→ 2401ST SENTENCE⟩ ........................ 143
```
She came to my aid.
彼女が助けにきてくれた。
⟨KANOZYO GA TASUKENI KITEKURETA⟩
```

⟨PARTS LINK INFORMATION OF 2401ST SENTENCE⟩

She        ⟨----⟩  彼女 ガ
                           ⟨KANOZYO GA⟩ came      ⟨----⟩  き て くれ た
                           ⟨KI TE KURE TA⟩ to my aid   ⟨----⟩  助け に
                           ⟨TASUKE NI⟩

⟨PARTS LINKS WHICH CAN BE USED FOR 2401ST SENTENCE⟩

She        ⟨****⟩  彼女 ガ
                           ⟨KANOZYO GA⟩ came      ⟨----⟩  き て くれ た
                           ⟨KI TE KURE TA⟩ to my aid   ⟨----⟩  助け に
                           ⟨TASUKE NI⟩

⟨PARTS WHICH CORRESPOND TO NO PARTS IN
ORIGINAL SENTENCE:PARTS IN "( )"⟩
  When (I fell into the river) he came to my aid.

FIG. 15B

<SECOND MOST SIMILAR SENTENCE → 1011TH SENTENCE> /-144

```
When I was his age, I used to study 24 hours every day.
私が彼の年齢の時には一日24時間勉強したものだ。
<WATASIGA KARENO NENREI NO TOKINIWA ICHINICHI 24 ZIKAN
BENKYO SITAMONODA>
```

<PARTS LINK INFORMATION OF 1011TH SENTENCE>

| When | <----> | 時には <TOKINIWA> |
| I | <----> | 私が <WATASI GA> |
| his age | <----> | 彼の年齢 <KARENONENNREI> |
| I used to study | <----> | 勉強した ものだ <BENKYOSI TA MONODA> |
| 24 | <----> | 24 |
| hours | <----> | 時間 <JIKAN> |
| every day | <----> | 一日 <ICHINICHI> |

<PARTS LINKS WHICH CAN BE USED FOR 1011TH SENTENCE>

| When | <****> | 時には <TOKINIWA> |
| I | <----> | 私が <WATASI GA> |
| his age | <****> | 彼の年齢 <KARENONENNREI> |
| I used to study | <****> | 勉強した ものだ <BENKYOSI TA MONODA> |
| 24 | <****> | 24 |
| hours | <****> | 時間 <JIKAN> |
| every day | <****> | 一日 |

<PARTS WHICH CORRESPOND TO NO PARTS IN ORIGINAL SENTENCE:PARTS IN "( )"

When I (fell into the river) he came to my aid.

FIG. 15C

<SECOND MOST SIMILAR SENTENCE
→1300TH SENTENCE> ─╴145

A car fell into the river.
車が川に落ちた。
<KURUMA GA KAWANI OCHITA>

<PARTS LINK INFORMATION OF 1300TH SENTENCE>
    A car     <---->  車 が
                           <KURUMA GA>
    fell into  <---->  落ち た
                           <OCHI  TA>
    the river  <---->  川 に
                           <KAWA NI>

<PARTS LINKS WHICH CAN BE USED FOR
1300TH SENTENCE>
    A car     <****>  車 が
                           <KURUMA GA>
    fell into  <---->  落ち た
                           <OCHI  TA>
    the river  <---->  川 に
                           <KAWA NI>

<PARTS WHICH CORRESPOND TO NO PARTS IN
ORIGINAL SENTENCE:PARTS IN "( )"
When I fell into the river he came to my aid.

<ALL REQUIRED JAPANESE PARTS> ─╴146

私が 落ちた 川に とき 彼は きてくれた 助けに
<WATASIGA OCHITA KAWANI TOKI KAREWA KITEKURETA TASUKENI>

<GENERATED TRANSLATED SENTENCE> ─╴147

私が川に落ちたとき彼は助けにきてくれた。
<WATASIGA KAWANI OCHITATOKI KAREWA TASUKENI KITE KURETA>

FIG. 15D

DICTIONARY DATABASE TRANSMISSION MAIN MENU

1 ENGLISH-TO-JAPANESE DICTIONARY TRANSMISSION
2 JAPANESE-TO-ENGLISH DICTIONARY TRANSMISSION
3 ENGLISH MORPHOLOGICAL ANALYSIS DICTIONARY TRANSMISSION
4 JAPANESE MORPHOLOGICAL ANALYSIS DICTIONARY TRANSMISSION
5 BILINGUAL CORRESPONDENCE PARTS ANALYSIS DICTIONARY TRANSMISSION
6 BILINGUAL CORRESPONDENCE DATABASE TRANSMISSION q END

ENTER SYMBOL  _

FIG. 16

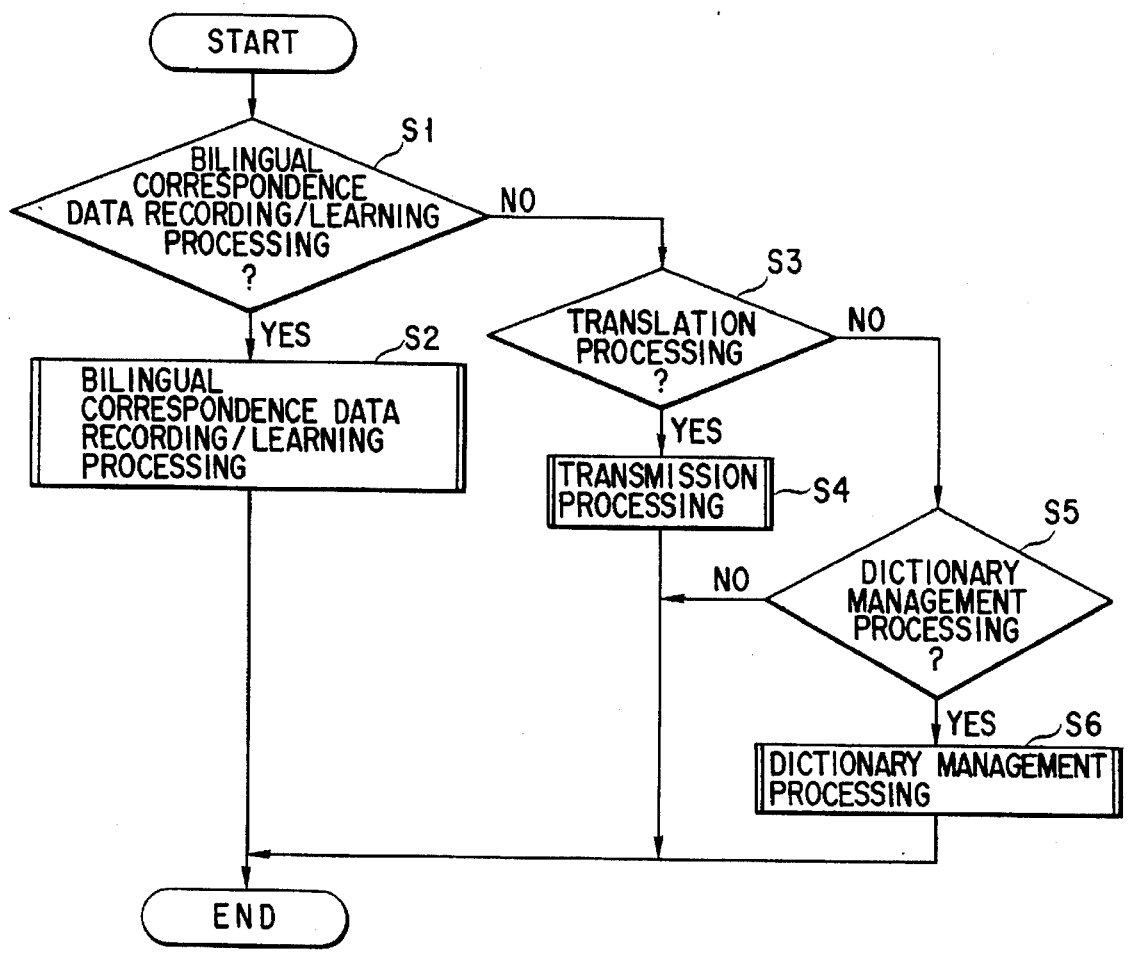

FIG. 17

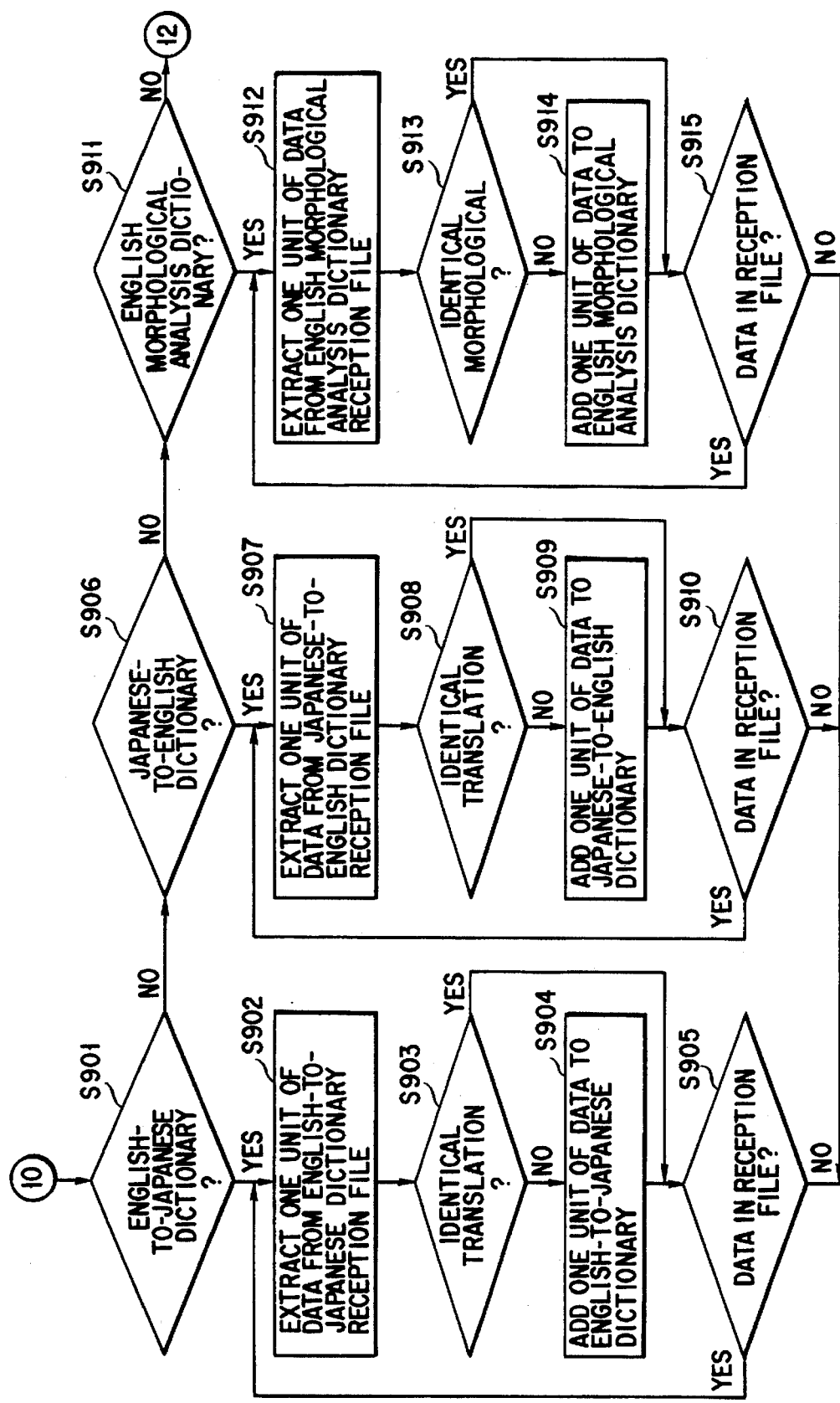

MACHINE TRANSLATION SYSTEM

BACKGROUND OF THE INVENTION

1. Field of the Invention

The present invention relates to a machine translation system for translating character strings written in a first language into character strings written in a second language and, more particularly, to a machine translation system which can improve its translation ability by learning translation examples.

2. Description of the Related Art

With recent advances in computer technology, machine translation systems for performing automatic translation have been developed. Many machine translation systems on the market use a translation scheme called a sentence-structure conversion scheme. An outline of processing performed by a machine translation system using the sentence-structure conversion scheme will be described below with reference to FIG. 1.

Assume that an English sentence "Development of computer science and linguistics opened the way to machine translation." is input to the machine translation system. In this case, the input English sentence is decomposed into words, and the parts of speech (e.g., noun (n) and transitive verb (vt)) of the decomposed words are determined (morphological analysis). Thereafter, the structure of the input English sentence is analyzed on the basis of predetermined grammatical rules. As a result, the input English sentence is decomposed into a noun phrase (NP), a verb phrase (VP), and the like (sentence-structure analysis). The sentence structure obtained by this analysis is converted into another language (e.g., Japanese), and morphemes are generated, thereby generating a Japanese sentence "<KEI-SANKIKAGAKU TO GENGOGAKU NO HATTEN WA KIKAIHONYAKU NI TAISHITE MICHIWO AKETA>". Although the sentence in the quotation marks would written in Japanese, it is here written in Roman letters within the marks "<>" for the sake of understanding of the contents.

Since a machine translation system of the sentence-structure conversion scheme performs translation on the basis only of grammatical rules, the system can express nothing outside the grammatical rules. As a result, an unnatural Japanese translation is output. For example, in the Japanese sentence generated above, the abstract noun "development" becomes the subject, and the active voice is employed. However, such a Japanese sentence is unnatural.

In order to solve this problem and improve the translation quality, grammatical rules must be added. As a result, the number of rules increases, and grammatical rules may interfere with each other, causing a deterioration in translation quality.

Under these circumstances, a machine translation system with an EBMT (Example-Based Machine Translation) scheme of performing translation on the basis of actual translations (translation examples) has recently been proposed (Nagao, M., "A Framework of a Mechanical Translation between Japanese and English by Analogy Principle", in ARTIFICIAL AND HUMAN INTELLIGENCE [Elitithorn 6 Baneriji, Eds.], Elsevier Science Publications, pp. 173–180, 1984). This machine translation system with an EBMT scheme retrieves the translation example which is most similar to the original sentence as a translation target, and performs translation on the basis of the translation example. Although practical means for realizing the machine translation system of the EBMT scheme have not been proposed yet, it is expected that the machine will perform processing like the one shown in FIG. 2.

According to the EBMT scheme machine translation system, in sentence-structure analysis processing, sentence-structure analysis (NP, VP, and the like) of an original sentence is performed on the basis of a past translation example, and sentence-structure conversion is performed on the basis of this sentence-structure analysis result, thereby generating a translation of the original sentence. A method of generating a Japanese sentence on the basis of sentence-structure analysis in this manner is disclosed in, for example, chapter 4 of "Example-Based Machine Translation," published as a doctorial thesis by Satoshi Sato (Kyoto University) in September 1991.

Various problems, however, are posed by the above conventional machine translation system, as follows.

First, it is difficult for the user to improve the translation ability of the conventional machine translation system. In a machine translation system using the sentence-structure conversion scheme, grammatical rules and sentence-structure rules must be revised in order to improve the translation ability. Since grammatical rules and sentence-structure rules are incorporated, as programs, in the machine translation system, only the system developer can revise the rules. Therefore, the user cannot improve the translation quality, and hence cannot make the machine translation system perform the desired translation. Assume that an undesired translation result is output. In this case, even if the user corrects the translation result, the undesired translation result is repeatedly output with respect to the same original sentence. For this reason, an excessive load of correction work is imposed on the user.

As described above, although a machine translation system with an EBMT scheme has not been put into practice yet, the translation ability can be theoretically improved by adding/recording translation examples. In adding/recording translation examples, however, the operator must perform grammatical analysis (NP, VP, and the like) of translation examples to be added/recorded. For this reason, the work load on the operator increases.

Second, in conventional machine translation systems, improvement in translation quality is limited. Assume that in the machine translation system of the sentence-structure conversion scheme, grammatical rules and sentence-structure rules are added to improve the translation quality. In this case, since the number of rules increases, rules tend to interfere with each other. For this reason, the improvement in translation quality is limited. On the contrary, if rules are added, the translation quality may deteriorate.

In the machine translation system of the EBMT scheme, although the translation quality can be theoretically improved by adding translation examples, practical means for realizing this system have not been proposed yet.

Third, it is difficult to make natural translations by using conventional machine translation systems. Actual sentences are not necessarily generated on the basis of only grammatical rules. However, in the machine translation system of the sentence-structure conversion Scheme, translation is performed on the basis only of grammatical rules and sentence-structure rules. Therefore, translation results tend to be unnatural. For example, the above English sentence "Development of computer science and linguistics opened the way to machine translation." should be translated into "<KEI-SANKIKAGAKU TO GENGOGAKU NO HATTEN NIYORI KIKAIHONYAKU HENO MICHIGA HIRAKETA>". However, the translation result is the unnatural translation "<KEISANKIKAGAKU TO GENGOGAKU NO HATTEN WA KIKAIHONYAKU NI TAISHITE MICHIWO AKETA>".

Since a machine translation system with an EBMT scheme performs translation on the basis of a past translation examples, a relatively natural translation can be output. However, since grammatical analysis is performed on the basis of past translation examples, a natural translation may not be output with respect to an idiomatic expression which greatly deviates from grammar.

Fourth, learning results obtained by other machine translation systems cannot be effectively used. In a machine translation system using a sentence-structure conversion scheme, translation examples cannot be learned. For this reason, as is apparent, a database on which translation examples are learned/recorded cannot be used in other machine translation systems. In a machine translation system using the EBMT scheme, translation examples can be recorded in a database. However, translation examples are independently learned/recorded in the respective machine translation systems. For this reason, when a plurality of machine translation systems are used, learning operations may be redundantly performed, resulting in an increase in the work load on the user who performs learning/recording processing.

SUMMARY OF THE INVENTION

It is the first object of the present invention to provide a machine translation system which can execute desired learning processing in accordance with commands from the operator, thereby improving the translation ability.

It is the second object of the present invention to provide a machine translation system which can reliably improve the translation quality without causing a deterioration in translation quality due to interference between grammatical rules.

It is the third object of the present invention to provide a machine translation system which can output a natural translated sentence with respect to, for example, even an idiomatic expression which is inconsistent with grammatical rules by performing learning processing.

It is the fourth object of the present invention to provide a machine translation system which can perform efficient learning/recording processing by sharing information held by a plurality of machine translation systems.

According to the first aspect of the present invention, there is provided a machine translation system comprising: first input means for inputting a first character string written in a first language; second input means for inputting a second character string written in a second language; display means for simultaneously displaying the first and second character strings input from the first and second input means; linking means which has first designating means for designating a third character string included in the first character string displayed by the display means, and second designating means for designating a fourth character string included in the second character string displayed by the display means, and links the third and fourth character strings with each other; recording means for recording the third and fourth character strings linked by the linking means as a pair; and means for detecting a character string which is most similar to an original character string written in the first language from a plurality of recorded third character strings, and translating the original character string into a character string written in the second language by using a fourth character string linked with the detected character string.

According to the above arrangement, the operator can flexibly set linking processing of bilingual correspondences to be added/recorded on a storage section such as a database on the basis of bilingual correspondence examples input from the input section and displayed on the display section such as a display. For example, when linking between English and Japanese sentences is to be designated, they need not be linked in one-to-one correspondence, and linking may be designated such that two Japanese sentences are linked with one English sentence.

According to the second aspect of the present invention, there is provided a machine translation system comprising: input means for inputting a first character string written in a first language, and a second character string obtained by translating the first character string into a second language; generating means for generating parts link information indicating linking between first parts included in the first character string input by the input means and second parts included in the second character string input by the input means; recording means for recording the parts link information generated by the generating means as dictionary information, together with the first and second parts; and translation means for translating an original character string written in the first language into a character string written in the second language by using the dictionary information.

According to the third aspect of the present invention, there is provided a machine translation system comprising: input means for inputting a first character string written in a first language, and a second character string obtained by translating the first character string into a second language; parts analysis storage means for storing first parts constituting a character string written in the first language, and second parts corresponding to the first parts and written in the second language; generating means for generating parts link information indicating linking between third parts constituting the first character string input by the input means and fourth parts constituting the second character string input by the input means on the basis of the first and second parts stored in the parts analysis storage means; recording means for recording the parts link information generated by the generating means, and adding/recording parts of the third and fourth parts, which are not recorded on the parts analysis storage means, on the parts analysis storage means; and translation means for translating an original character string written in the first language into a character string written in the second language by using the parts link information.

According to the fourth aspect of the present invention, there is provided a machine translation system comprising: input means for inputting a first character string written in a first language, and a second character string obtained by translating the first character string into a second language; parts analysis storage means for storing first parts constituting a character string written in the first language, and second parts corresponding to the first parts and written in the second language; word storage means for storing a plurality of pairs of words, each pair being constituted by a word written in the first language and a word obtained by translating the word written in the first language into the second language; generating means for generating parts link information indicating linking between third and fourth parts by using the first and second parts with respect to parts, of the third and fourth parts respectively constituting the first and second character strings input by the input means, which are stored in the parts analysis storage means, and using words stored in the word storage means with respect to parts, of the third and fourth parts, which are not recorded on the parts analysis storage means; recording means for recording the parts link information generated by the generating means, and adding/recording parts of the third and fourth parts, which are not recorded on the parts analysis storage means, on the parts analysis storage means; and means for translating an original character string written in the first language into a character string written in the second language by using the parts link information.

According to the above arrangement, parts link information indicating linking between parts constituting the first character string (sentence) written in the first language and parts constituting the second character string (sentence) written in the second language is generated, and learning can be performed in units of parts. Therefore, the machine translation system need not learn an original sentence and a translated sentence of the original sentence, which is obtained in advance, by performing sentence-structure analysis, and can directly learn the original sentence and the translated sentence in one-to-one correspondence.

With this processing, the load of learning processing on the machine translation system and the operator can be greatly reduced.

According to the fifth aspect of the present invention, there is provided a machine translation system comprising: storage means for storing a plurality of first character strings written in a first language, and a plurality of second character strings obtained by translating the plurality of first character strings into a second language; detecting means for detecting the third character string which is most similar to an original character string written in the first language from the plurality of first character strings stored in the storage means; and translation means for determining whether each part constituting the original character string coincides with each part constituting the third character string, generating parts written in the second language with respect to the parts which coincide with each other by using a character string included in the plurality of second character strings and corresponding to the third character string, and translating the original character string into a character string of the second language by using the generated parts.

According to the above arrangement, translation processing can be performed in units of parts. With this processing, a natural translated sentence based on past translation examples can be output as compared with the case wherein sentence-structure analysis is performed, and translation processing is performed on the basis of sentence-structure rules. In addition, this machine translation system can obtain the same effect as that obtained by a system designed to output a translated sentence corresponding to a sentence held in advance only when the held sentence perfectly coincides with an original sentence.

According to the sixth aspect of the present invention, there is provided a machine translation system comprising: transmission means for transmitting information; and a plurality of terminals, each of the plurality of terminals including storage means for storing bilingual correspondence information including a plurality of first character strings written in a first language and a plurality of second character strings obtained by translating the first character strings into a second language, means for detecting a third character string which is most similar to an original character string written in the first language from the plurality of first character strings, and translating the original character string into a character string written in the second language by using a character string corresponding to the detected third character string and included in the plurality of second character strings, and transmission and reception means for transmitting/receiving bilingual correspondence information stored in the storage means to/from another terminal via the transmission means.

According to the above arrangement, data such as parts link information stored upon learning processing can be transmitted/received via a communication system such as an Ethernet. With this operation, various information can be shared among a plurality of machine translation systems (terminals such as work stations), and the efficiency of learning processing, translation processing, and the like can be improved.

The following advantages can be obtained by the machine translation system according to each aspect described above. First, the translation ability can be improved in accordance with commands from the operator. That is, translation examples can be learned by performing bilingual correspondence data recording and bilingual correspondence learning (generation of parts link information). Therefore, by making the machine translation system learn desired translation examples, the user can improve the translation ability of the system. Especially, the degree of freedom of commands from the operator is high, and the machine translation system can flexibly cope with commands for idiomatic expressions and the like. In addition, since learning/ recording processing can be automatically performed on the basis of past learning results (bilingual correspondence parts), the load of work on the operator in learning/recording processing can be reduced.

Second, since the translation quality can be improved without adding grammatical rules such as "If - - - then . . . ", a deterioration in translation quality caused by interference between added grammatical rules can be prevented.

Third, natural translations can be made. Since translation is performed on the basis of past translation examples instead of grammatical rules, a natural translation of an idiomatic expression which is inconsistent with grammatical rules can be made. In addition, this system translates each part of an original sentence while comparing an original with a translation example similar to the original sentence in units of parts, unlike a machine translation system of the general EBMT scheme. Therefore, each part of an original sentence can be translated flexibly instead of strictly following grammatical rules, thereby outputting a more natural translation.

Additional objects and advantages of the invention will be set forth in the description which follows, and in part will be obvious from the description, or may be learned through use of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 4 is a view showing a state wherein a plurality of machine translation systems, each shown in FIG. 3, are connected to each other via a communication line;

FIG. 6 is a view showing a display screen set for bilingual correspondence recording processing in the machine translation system according to the present invention when Japanese and English sentences are recorded in pairs on the same file;

FIG. 7 is a view showing a display screen set for bilingual correspondence recording processing in the machine translation system according to the present invention when Japanese and English sentences are recorded in different files;

FIGS. 8A and 8B are views showing a display screen in bilingual correspondence learning processing in the machine translation system according to the present invention;

FIG. 10 is a view showing word link information, English parts information, Japanese parts information, parts link information, and the like associated with the bilingual correspondence shown in FIG. 9;

FIGS. 11A and 11B are views for explaining Japanese-to-English translation processing in the machine translation system according to the present invention;

FIG. 12 view showing examples of an original English sentence and a translated Japanese sentence which are printed by a printer in the machine translation system according to the present invention;

FIG. 13 is a view showing examples of an original Japanese sentence and a translated English sentence which are printed by a printer in the machine translation system according to the present invention;

FIGS. 15A to 15D are views explaining translation processing performed by retrieving similar sentences in the machine translation system according to the present invention;

FIG. 16 is a view showing a dictionary database transmission main menu in dictionary database transmission/reception processing in the machine translation system according to the present invention;

FIG. 17 a flow chart explaining the operation of the machine translation system in FIG. 3;

FIGS. 27A to 27D are flow charts explaining detailed processing to be performed when dictionary database transmission/reception is selected in the flow chart shown in FIG. 20.

DETAILED DESCRIPTION OF THE PREFERRED EMBODIMENT

A machine translation system according to an embodiment of the present invention will be described below with reference to the accompanying drawings. Although not displayed on a display or the like in general, each Japanese translation is written in Roman letters within "<>" in the specifications and the drawings for the sake of understanding of the present invention.

Figure 1:
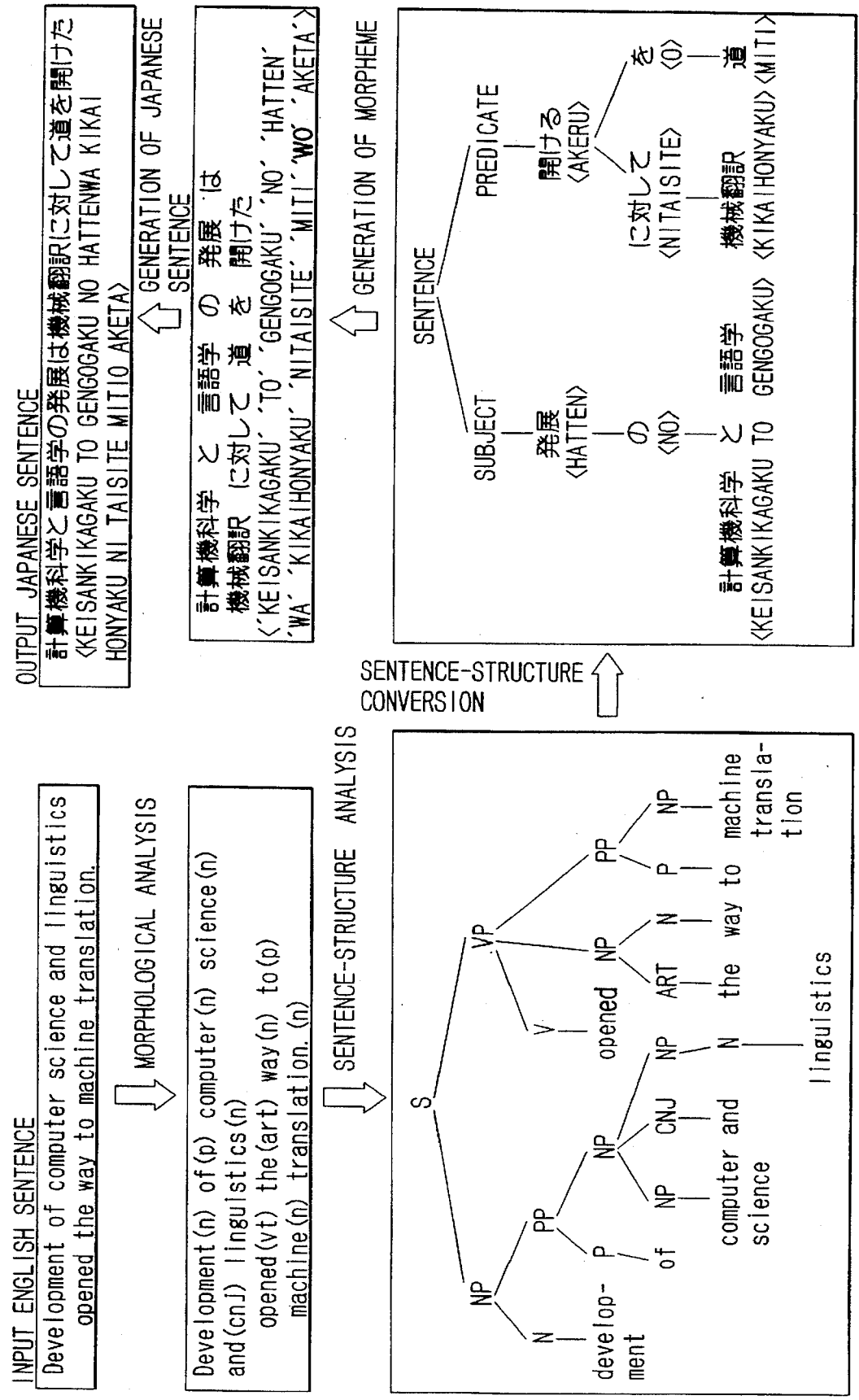
FIG. 1 is a view explaining an outline of processing performed by a conventional machine translation system with a sentence-structure conversion scheme.
Figure 2:
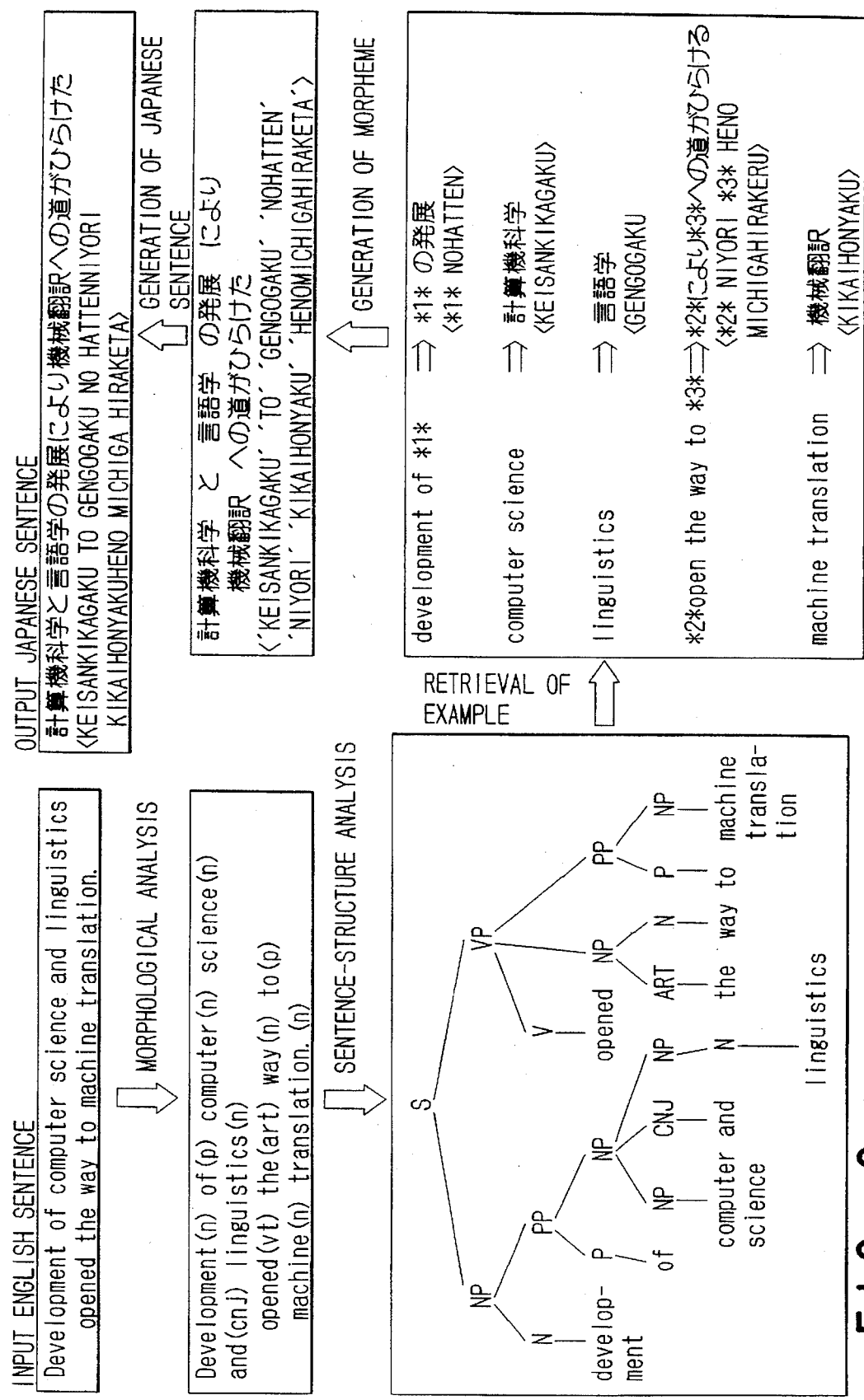
FIG. 2 is a view explaining an outline of processing performed by a conventional machine translations/system with an EBMT scheme.
Figure 3:
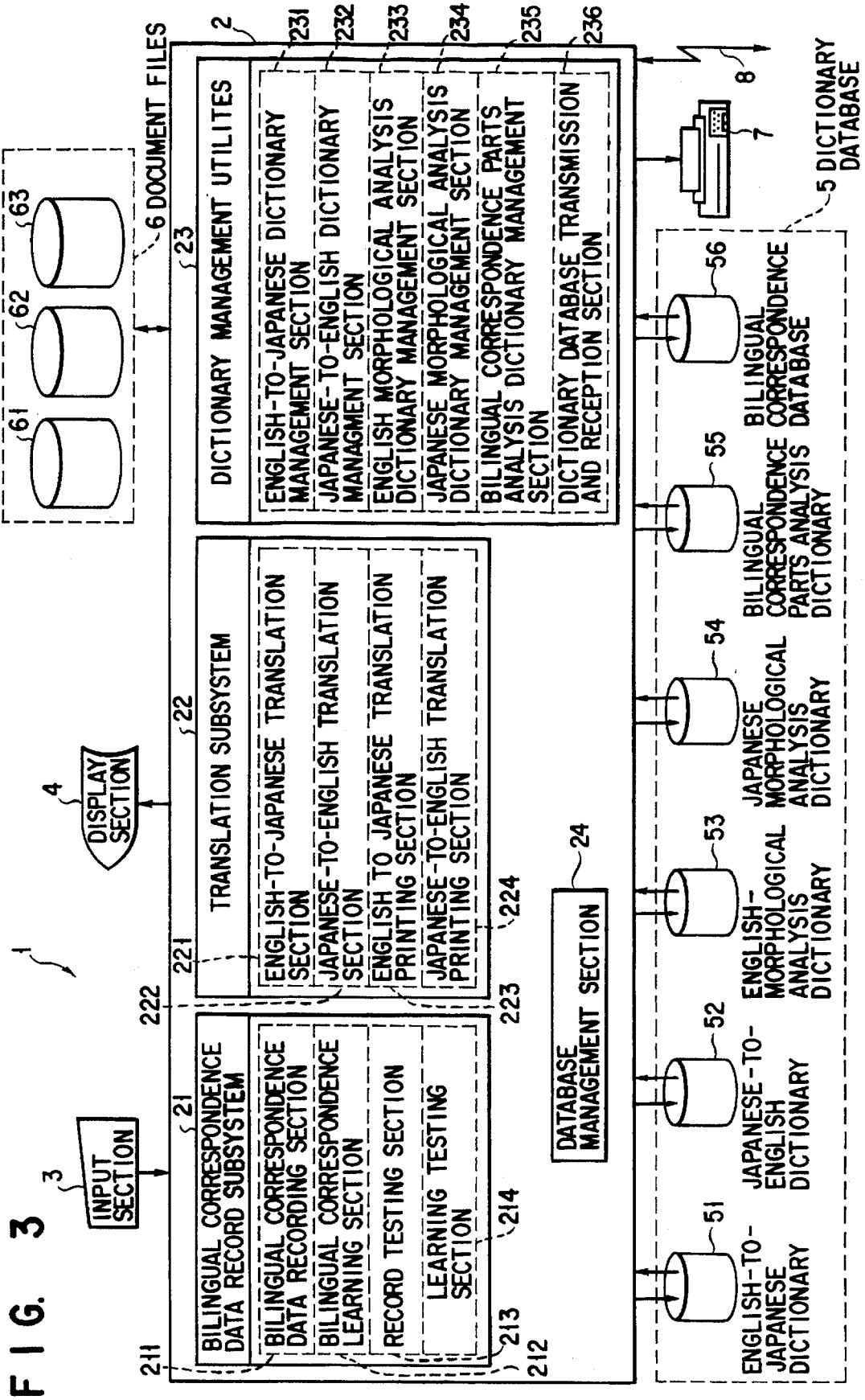
FIG. 3 is a block diagram showing the arrangement of a machine translation system according to an embodiment of present invention.

FIG. 3 shows the arrangement of a machine translation system according to an embodiment of the present invention. The machine translation system of this embodiment is based on an EBMT (Example-Based Machine Translation) scheme of performing translation on the basis of translation examples. As will be described in detail later, in the machine translation system according to the present invention, sentence-structure analysis as in the conventional EBMT scheme need not be performed.

As shown in FIG. 3, a machine translation system 1 comprises a mainframe 2 constituted by processors, memories, and the like, an input section 3 such as a keyboard or an OCR (optical character reader), a display section 4 constituted by an LCD (liquid crystal display), a CRT (cathode ray tube), and the like, a dictionary database section 5, document files 6, and a printer section 7.

The mainframe 2 comprises a bilingual correspondence data record subsystem 21, a translation subsystem 22, dictionary management utilities 23, and a database management section 24.

The bilingual correspondence data record subsystem 21 performs learning, recording, and etc. of translation examples and comprises a bilingual correspondence data recording section 211, a bilingual correspondence learning section 212, a record testing section 213, and a learning testing section 214. The translation subsystem 22 executes translation from Japanese to English or from English to Japanese in accordance with predetermined processing (to be described later) and comprises an English-to-Japanese translation section 221, a Japanese-to-English translation section 222, an English-to-Japanese translation printing section 223, and a Japanese-to-English translation printing section 224. The dictionary management utilities 23 perform dictionary management and database transmission/reception processing and comprise an English-to-Japanese dictionary management section 231, a Japanese-to-English dictionary management section 232, an English morphological analysis dictionary management section 233, a Japanese morphological analysis dictionary management section 234, a bilingual correspondence parts analysis dictionary management section 235, and a dictionary database transmission and reception section 236. The database management section 24 performs various types of management processing of information held in the dictionary database section 5. Note that the database management section 24 operates when data is to be retrieved from the dictionary database section 5 in recording processing of bilingual correspondence data, bilingual correspondence data learning processing, and translation processing which are performed by the bilingual correspondence data record subsystem 21 and the translation subsystem 22.

The dictionary database section 5 holds various information to be referred to in translation processing and comprises an English-to-Japanese dictionary 51, a Japanese-to-English dictionary 52, an English morphological analysis dictionary 53, a Japanese morphological analysis dictionary 54, a bilingual correspondence parts analysis dictionary 55, and a bilingual correspondence database 56.

The document files 6 hold various types of English and Japanese sentences. In this embodiment, Japanese and English sentences are written in pairs in a document file 61, and the English sentences and the Japanese sentences are respectively held in document files 62 and 63.

This machine translation system 1 may be constituted by a plurality of work stations. In this case, the work stations are connected on-line to each other via a communication system 8 such as an Ethernet so that data from the dictionary database section 5 such as dictionary data (to be described later) can be transmitted and received among the work stations. FIG. 4 shows a state wherein the respective work stations are connected. Note that three work stations 1A to 1C are connected to each other in the case shown in FIG. 4.

Figure 5:
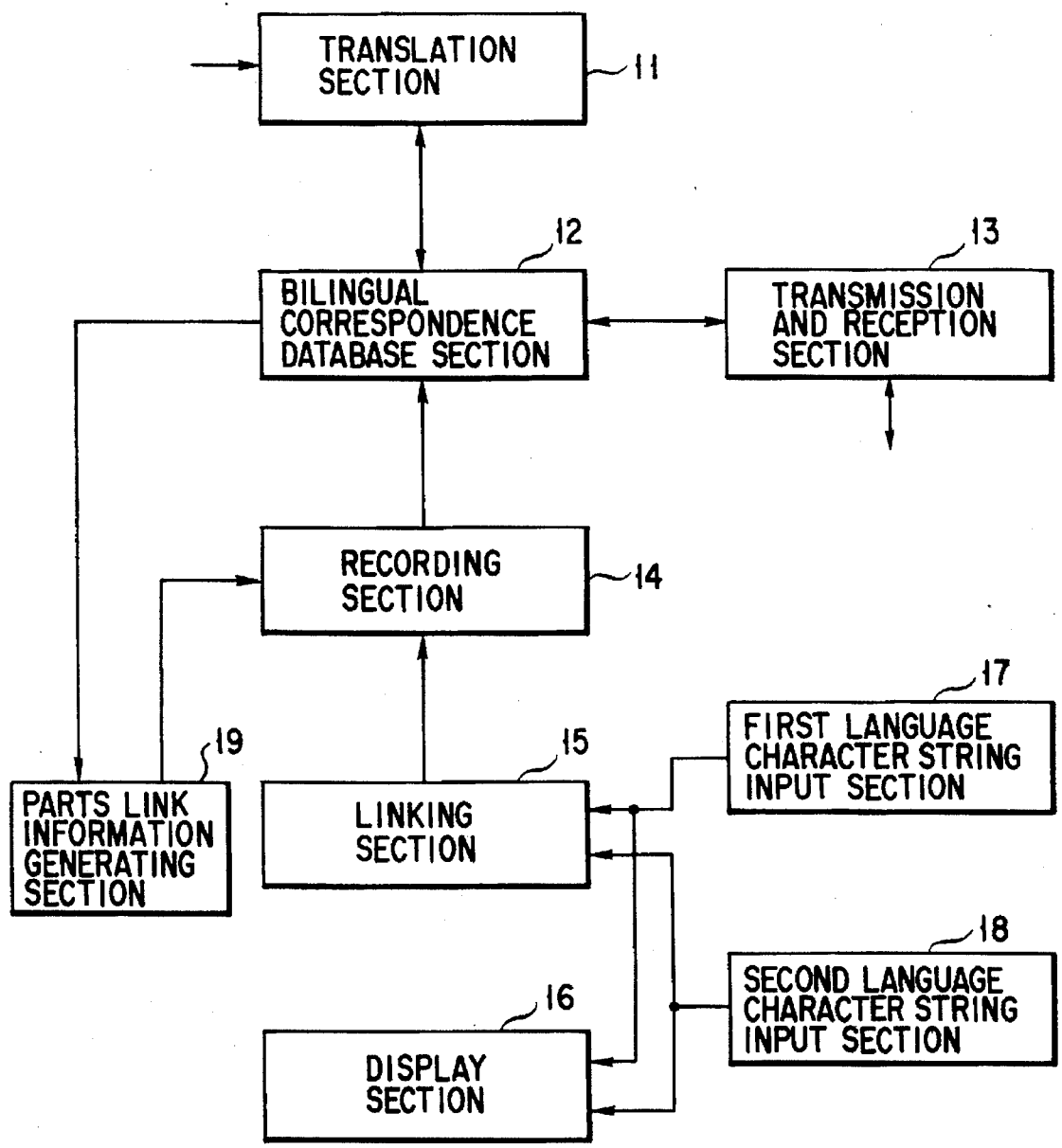
FIG. 5 is a block diagram showing the functions of the machine translation system shown in FIG. 3.

FIG. 5 shows the functions of the machine translation system 1 shown in FIG. 3. As shown in FIG. 5, the machine translation system 1 according to the present invention has functions realized by a translation section 11, a bilingual correspondence database section 12, a transmission and reception section 13, a recording section 14, a linking section 15, a display section 16, a first language character string input section 17, a second language character string input section 18, and parts link information generating section 19. The translation section 11 performs translation processing of an original character string as a translation target, which is input in accordance with a command from the operator, in units of parts by using bilingual correspondence examples, parts link information, and the like held in the bilingual correspondence database section 12. The bilingual correspondence database section 12 holds and manages bilingual correspondence examples, parts link information, and the like. The transmission and reception section 13 transmits various information held in the bilingual correspondence database section 12 to another machine translation system via a predetermined communication system, and receives various information transmitted via the communication system. The recording section 14 records a bilingual correspondence linked by the linking section 15 or parts link information generated by the parts link information generating section 19 on the above bilingual correspondence database. The first and second language character string input sections 17 and 18 respectively input first and second language character strings. The input first and second language character strings are displayed by the display section 16. The linking section 15 performs linking processing of the displayed first and second language character strings in accordance with a command from the operator, and sends the result to the recording section 14. The parts link information generating section 19 generates parts link information on the basis of the bilingual correspondences recorded on the bilingual correspondence database section 12 by the recording section 14.

Parts and parts linking will be described below.

In this machine translation system, each of the English and Japanese sentences of recorded bilingual correspondences is decomposed into elements having sizes allowing linking processing on the word, phrase, or sentence level. Each decomposed element is called a bilingual correspondence part (part). In addition, the machine translation system infers English and Japanese bilingual correspondence parts which correspond to each other from past learning results and parts analysis results, thereby automatically performing linking processing. This operation will be referred to as automatic parts linking.

The respective subsystems and utilities of the mainframe 2 will be described next with reference to the accompanying drawings. As shown in FIG. 3, the mainframe 2 is constituted by the bilingual correspondence data record subsystem 21, the translation subsystem 22, the dictionary management utilities 23, and the database management section 24.

(1) Bilingual Correspondence Data Record Subsystem 21

The bilingual correspondence data record subsystem 21 is a subsystem for recording and learning translation examples (actual translations), and includes the following constituent elements.

■ Bilingual Correspondence Data Recording Section 211

The bilingual correspondence data recording section 211 links and records English and Japanese sentences in the document files 6 as translation examples (bilingual correspondence data recording). By linking and recording English and Japanese sentences in this manner, the same Japanese sentence can be output with respect to the same English sentence in later translation processing.

The following two bilingual correspondence data recording methods are available. In the first method, Japanese and English sentences in the same file are recorded. In the second method, Japanese and English sentences stored in different files are recorded.

The first method of recording Japanese and English sentences in the same file will be described first. Japanese and English sentences are written in pairs in the Japanese/ English document file 61. The mainframe 2 reads out a pair of Japanese and English sentences from the Japanese/ English document file 61. The readout Japanese and English sentences are displayed on the display section 4, as shown in FIG. 6.

A Japanese sentence 101 "<6. 3. 1. NO KOU NO KEI-SANHOUHOU NIYORI, BONDYINGU SARERU BUBUNNI GINMEKKIGA SAITEI 150 MAIKUROIN-CHI NO ATSUSADE BUBUNMEKKIGA HODOKOSA-RETEIRUKOTO>" corresponding to an English sentence 100 "Selectively plated with minimum of 150 micro inches of silver on the bonding area, measured as in section 6. 3. 1." is a Japanese translation made by a translator. Watching this display screen, the operator issues a command to the mainframe 2 to record the English sentence 100 and the Japanese sentence 101 in pair. In response to this command, the bilingual correspondence data recording section 211 records the English sentence 100 and the Japanese sentence 101 on the bilingual correspondence database 56 via the database management section 24. At this time, key data used to retrieve this bilingual correspondence data in translation processing is also recorded on the bilingual correspondence database 56. In addition, in response to the command, "recording is performed with sentence number 3646: OK? [y/n]" is displayed with respect to the bilingual correspondence to be recorded. If "y" is selected, unique sentence number 3646 generated in the mainframe 2 is added and recorded. With this operation, the bilingual correspondence can be retrieved with this sentence number.

The bilingual correspondence data recording section 211 performs bilingual correspondence data recording of the English sentence 100 and the Japanese sentence 101 on the basis of the English morphological analysis dictionary 53 and the Japanese morphological analysis dictionary 54 on which word information and parts-of-speech information (results obtained by decomposing English and Japanese sentences into parts of speech and parts-of-speech information) are recorded. That is, if the English sentence 100 to be subjected to bilingual correspondence recording includes a word which is not recorded on the English morphological analysis dictionary 53, the word is displayed on a non-recorded English word display column 103. Similarly, if the Japanese sentence 101 to be subjected to bilingual correspondence recording includes a word which is not recorded on the Japanese morphological analysis dictionary 54, the word is displayed on a non-recorded Japanese word display column 104. As long as non-recorded words are displayed on these non-recorded word display columns 103 and 104, bilingual correspondence recording cannot be performed. Note that the system can be made to perform the bilingual correspondence recording when non-recorded words are displayed. In this system, these non-recorded words are displayed. In this system, these non-recorded words are regarded as nouns. When the operator records the non-recorded words, the non-recorded word display columns 103 and 104 become blank columns, and bilingual correspondence recording can be performed.

The second recording method is a method of performing bilingual correspondence recording of English and Japanese sentences stored in different files. English sentences are stored in the English document file 62, and Japanese sentences are stored in the Japanese document file 63. If English and Japanese sentences are stored in different files in this manner, linking between English and Japanese sentences is unknown. Therefore, the following processing must be performed. First of all, the mainframe 2 reads out English and Japanese sentences from the English and Japanese files 62 and 63, and displays these English and Japanese sentences on the same screen of the display section 4, as shown in FIG. 7. The operator inputs a command 108 to designate English and Japanese sentences to be recorded as bilingual correspondence data. Assume that a Japanese sentence 107 corresponding to an English sentence 106 is designated. In this case, the bilingual correspondence data recording section 211 records bilingual correspondence data consisting of the English and Japanese sentences 106 and 107 on the bilingual correspondence database 56. At this time, a corresponding bilingual correspondence sentence number and key data are also recorded on the bilingual correspondence database 56.

Note that bilingual correspondence recording need not be performed in units of sentences and may be performed in units of words or sentences. Alternatively, bilingual correspondence recording may be performed with an entire sentence being linked with one word.

■ Bilingual Correspondence Learning Section 212

The bilingual correspondence learning section 212 performs bilingual correspondence learning processing of bilingual correspondence data recorded by the bilingual correspondence data recording section 211. In bilingual correspondence learning processing, the English and Japanese sentences recorded as bilingual correspondence data are decomposed into parts, and the English and Japanese parts are linked with each other. Such bilingual correspondence learning processing allows retrieval of the English sentence which is most similar to an English sentence as a translation target from the English sentences having undergone bilingual correspondence recording, thereby realizing a natural Japanese translation. In the same manner, the Japanese sentence which is most similar to a Japanese sentence as a translation target is retrieved from Japanese sentences having undergone bilingual correspondence recording, thereby realizing a natural English translation.

FIGS. 8A and 8B show a display screen in bilingual correspondence learning processing. This display screen is set when bilingual correspondence learning of English and Japanese sentences 111 and 112 with bilingual correspondence sentence number 3646 is to be performed. The bilingual correspondence learning section 212 decomposes the English sentence 111 into words and phrases called parts to generate English parts information 116. Similarly, the bilingual correspondence learning section 212 generates Japanese parts information 117 from the Japanese sentence 112. Each numerical value before [:] in the English parts information 116 and the Japanese parts information 117 represents the original number of a corresponding part in the English and Japanese sentences 111 and 112.

The bilingual correspondence learning section 212 performs inference on the basis of the English parts information 116, the Japanese parts information 117, and past learning results to automatically link the English and Japanese sentences 111 and 112 in units of parts (parts linking). Assume that the part [Selectively plated] is linked with the part [<BUBUNMEKKI GA HODOKOSARETEIRUKOTO>] in the past bilingual correspondence learning processing. That is, the two parts are recorded, as a bilingual correspondence, on the bilingual correspondence parts analysis dictionary 55. In this case, the bilingual correspondence learning section 212 can automatically link the parts [1: Selectively 2: plates] with the parts [18: <BUBUN>19: <MEKKIGA>20: <HODOKOSA>21: <RETE>22: <IRU>23: <KOTO>]. The information "<<1: Selectively 2: plated 18: <BUBUN>19: <MEKKIGA>20: <HODOKOSA>21: <RETE>22: <IRU>23: <KOTO>>>" in parts link information 113 indicates that the English and Japanese sentences are linked with each other.

Similarly, assume that the part [minimum of] has already been linked with the part [<SAITEI>] in past bilingual correspondence learning processing, and the two parts have been recorded on the bilingual correspondence parts analysis dictionary 55. The bilingual correspondence learning section 212 can automatically link the part [minimum of] in the English sentence 111 with the Japanese part [<SAITEI>] in the Japanese sentence 112.

If the English and Japanese sentences 111 and 112 include parts which have not been linked with each other in past learning processing, information like "<<3: with ****>>" is displayed in the parts link information 113. When the operator sees this display, he/she can recognize the non-linked part. Linking of non-linked parts is performed by the operator. For example, the operator inputs ordinal number "3" of the corresponding part [3: with] and ordinal numbers "16" and "17" of the parts [16: <ATUSA>17: <DE>] (reference numeral 118), thereby linking the part [3: with] with the parts [16: <ATUSA>17: <DE>]. Similarly, the operator inputs ordinal numbers "13" and "14" of the parts [13: measured 14: as] and ordinal numbers "3", "4", and "5" of the corresponding parts [3: <KEISOKU>4: <HOUHOU>5: <NIYORI>], thereby linking the parts [13: measured 14: as] with the parts [3: <KEISOKU>4: <HOUHOU>5: <NIYORI>]. These parts [13: measured 14: as] and [3: <KEISOKU>4: <HOUHOU>5: <NIYORI>] are recorded on the bilingual correspondence parts analysis dictionary 55.

In this manner, the parts link information 113 representing the linking between the respective parts of the English and Japanese sentences 111 and 112 is generated. The parts link information 113 is recorded on the bilingual correspondence database 56 while being linked with the English and Japanese sentences 111 and 112. This parts link information 113 is used in translation processing (to be described later).

Figure 9:
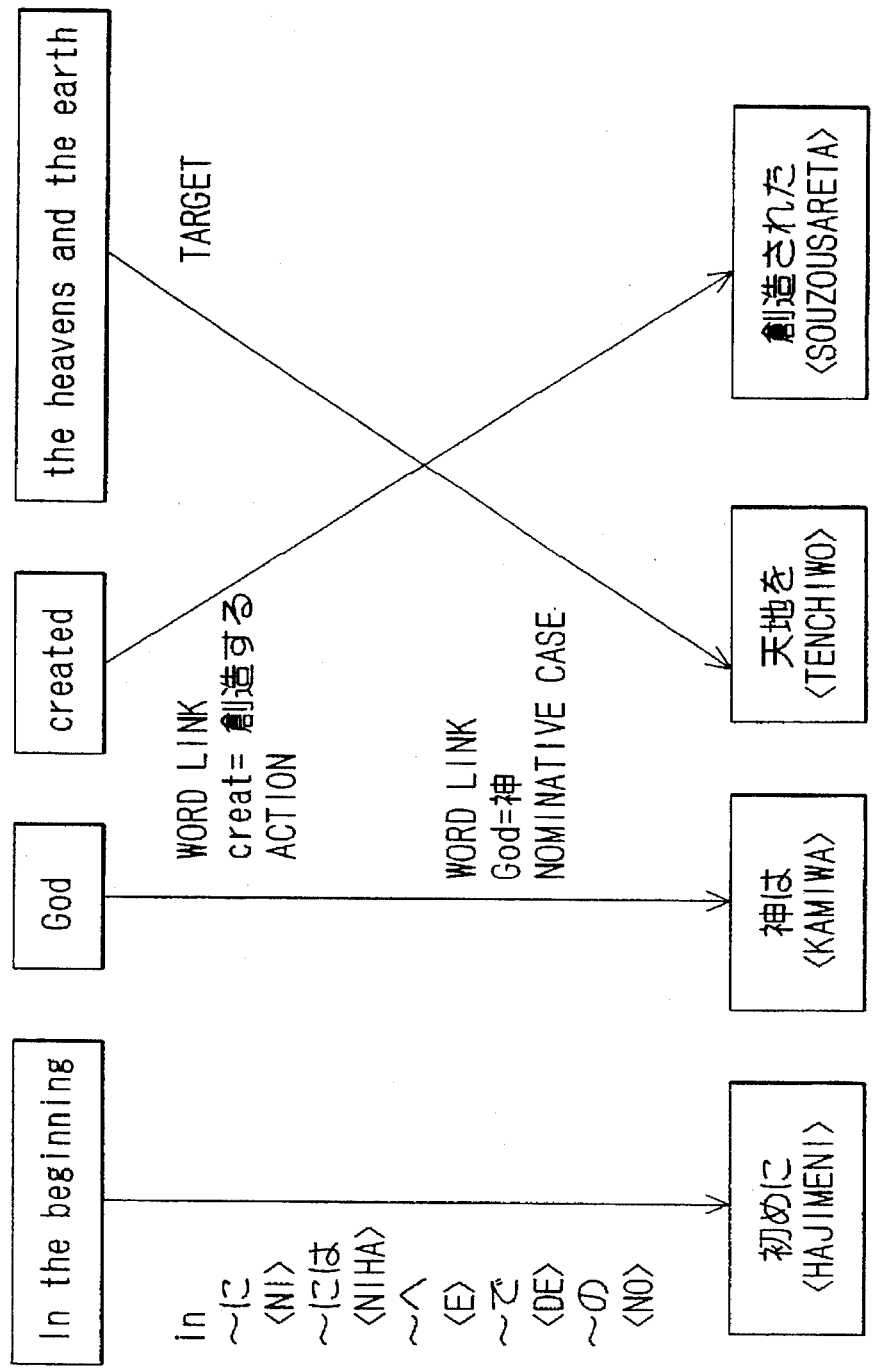
FIG. 9 is a view showing a bilingual correspondence of Japanese and English sentences which are referred to in explaining the operation of the machine translation system according to the present invention.

In bilingual correspondence learning, information associated with grammatical analysis of each part and the like are generated, in addition to parts link information. This operation will be described by taking the case of the English sentence "In the beginning God created the heavens and the earth" and the Japanese sentence "<HAJIMENI KAMIWA TENCHI WO SOUZOUSARETA>" with reference to FIGS. 9 and 10.

The part [In the beginning] includes the preposition [In]. For this reason, [In the beginning] is linked with the adverbial part [<HAJIMENI>]including the postposition [<NI>] corresponding to [In]. Since [God] is used as a nominative case in the sentence, it is linked with [<KAMIWA>] on the basis of word link information 123. [Created] is linked with [<SOUZOUSARETA>], which is in the passive verb form. In addition, since the part [the heavens and the earth] is a noun but is not a nominative case ([God] is the nominative case), it is linked with [<TENCHIWO>] which is an object. The above grammatical analysis results are recorded on the bilingual correspondence database 56, together with parts link information 126. In translation processing (to be described later), a translated sentence is generated on the basis of these pieces of information. That is, the part indicating the nominative case is placed at the position of the nominative case of the translated sentence, and the part indicating an action is placed at the position of the predicate of the translated sentence.

■ Record Testing Section 213

The record testing section 213 serves to perform maintenance of the bilingual correspondence data recorded on the bilingual correspondence database 56. That is, the record testing section 213 has functions of performing display, deletion, addition, retrieval, and the like of bilingual correspondence data recorded on the bilingual correspondence database 56.

■ Learning Testing Section 214

The learning testing section 214 performs management processing such as display, deletion, addition, and retrieval of parts link information and the like recorded on the bilingual correspondence database 56. FIG. 10 shows a display screen in a learning testing operation. On this display screen, English morphemes 121, Japanese morphemes 122, word link information 123, English parts information 124, Japanese parts information 125, and parts link information 126 are displayed. These pieces of information 121 to 126 are associated with the English sentence "In the beginning God created the heavens and the earth" and the Japanese sentence "<HAJIMENI KAMIWA TENCHIWO SOUZOUSARETA>".

The English morphemes 121 and the Japanese morphemes 122 are constituted by information such as words and parts of speech. The English sentence "In the beginning God created the heavens and the earth" shown in FIG. 9 can be decomposed into English morphemes as pairs of words and parts of speech like [In: preposition], [the: article], [beginning: noun], [God: noun], [created: transitive verb], [the: article], [heavens: noun], [and: conjunction], [the: article], and [earth: noun]. Similarly, the Japanese sentence "<KAMIWA HAJIMENI TENCHIWO SOUZOUSARETA>" can be decomposed into Japanese morphemes as pairs of words and parts of speech like [<HAJIME>: noun], [<NI>], [\], [<KAMI>: noun], [<WA>], [<TENCHI>: noun], [<WO>], [<SOUZOUSA>: noun +SA], [<RE>], [<TA>].

The word link information 123 indicates the same words and phrases in the English morphemes 121 and the Japanese morphemes 122 as those recorded on the English-to-Japanese 51 and the Japanese-to-English dictionary 52. That is, the words and phrases indicated by the word link information 123 indicate that linking can be performed by only using the dictionaries 51 and 52 without using any past learning results. If, however, parts identical to these words and phrases have been recorded on the bilingual correspondence parts analysis dictionary 55, linking is performed in bilingual correspondence learning of the words and phrases on the basis of the parts link information 126.

[4: transitive verb created: 7] in the word link information 123 indicates that the fourth (counted from the zeroth) morpheme [created: transitive verb] in the English morphemes 121 corresponds to the seventh (counted from the zeroth) morpheme [<SOUZOUSA>: noun +SA] in the Japanese morphemes 122.

The English parts information 124, the Japanese parts information 125, and the parts link information 126 are the same as those described above. That is, the English parts information 124 and the Japanese parts information 125 indicate words and phrases decomposed on the basis of past learning results and the like. The parts link information 126 indicates the linking among decomposed words and phrases.

(2) Translation Subsystem 22

The translation subsystem 22 comprises the English-to-Japanese translation section 221 for performing translation from English to Japanese, the Japanese-to-English translation section 222 for performing translation from Japanese to English, the English-to-Japanese translation printing section 223 for printing out an English-to-Japanese translation result, and the Japanese-to-English translation printing section 224 for printing out a Japanese-to-English translation result.

■ English-to-Japanese Translation Section 221 and Japanese-to-English Translation Section 222

The English-to-Japanese translation section 221 translates an English sentence into a Japanese sentence on the basis of the parts link information, key data, and the like recorded on the bilingual correspondence database 56. The Japanese-to-English translation section 222 translates a Japanese sentence into an English sentence.

FIGS. 11A and 11B show an outline of Japanese-to-English translation processing. Assume that an original sentence 131 is supplied to the Japanese-to-English translation section 222. In this case, the Japanese-to-English translation section 222 retrieves a Japanese sentence (bilingual correspondence sentence number 3646) 133 which is most similar to the original sentence 131 from the bilingual correspondence data recorded on the bilingual correspondence database 56. A bilingual correspondence (English translation) of the Japanese sentence 133 retrieved in this manner has been recorded as an English sentence 132. The Japanese-to-English translation section 222 reads out parts link information 134 of the bilingual correspondence sentence number 3646 from the bilingual correspondence database 56, and compares each part of the Japanese sentence in the parts link information 134 with each part in the original sentence 131.

A list 135 exemplifies the comparison result. Each display <****>in the list 135 indicates that there is no coincidence.

Since the parts "150", "<KEISOKUHOUHOUNIYORI>", "<KOUNO>", and "<6.3.1 NO>" in the parts link information 134 do not coincide with any parts of the original sentence 131, <**> is attached to these parts. In this case, the parts having <**> attached thereto are not required and hence deleted, and the numerals are replaced. The resultant sentence is output as a translation result.

The character string (having the highest similarity) which is most similar to an original sentence is retrieved by the following procedure. Assume that an original sentence [<SINPOGAICHIJIRUSHI>]is given. The independent words in this original sentence are [<SINPO>] and [<ICHIJIRUSHI>]. Therefore, character strings including the independent words [<SINPO>] and [<ICHIJIRUSHI>] are retrieved from the bilingual correspondence database 56. Assume that the following three character strings are retrieved:

character string 1: [<KIKAIHONYAKUNO SHINPOGA ICHIJIRUSHI>]

character string 2: [<ICHIJIRUSHIKU SHINPOSHITA GIJYUTU>]

character string 3: [<GIJYUTUNO SINPO TO SEIHIN NO KAKAKU>]

These character strings are then classified into the following sets. Note that the similarity of set I is the highest, and the similarities of sets II and III decrease in this order.

set I: character strings including an original sentence set II: character strings including all the constituent words of an original sentence set III: character strings including some constituent words of an original sentence According to these definitions, character strings 1, 2, and 3 respectively belong to sets I, II, and III. Therefore, character string I has the highest similarity with respect to the original sentence. If a plurality of character strings belong to the same set, the respective similarities are determined by the following method.

A character string consecutively including a plurality of constituent words of an original sentence without any other words inserted therein is defined as a character string having the highest similarity. A character string in which the ratio of the number of constituent words of the original sentence to the number of independent words of the character string is high is defined as a character string having the second highest similarity. A character string including more constituent words of the original sentence is defined as a character string having the third highest similarity. Note that the method of determining similarities is not limited to the one described above, and other methods may be used to determine similarities. In this case, the sentence numbers of a plurality of bilingual correspondences extracted from the bilingual correspondence database are arranged in the order of the similarities upon similarity calculation, and comparison is sequentially performed in the order of the decreasing similarity. However, every time comparison is performed, similarity calculation may be performed to read out a bilingual correspondence.

■ English-to-Japanese Translation Printing Section 223 and Japanese-to-English Translation Printing Section 224

The English-to-Japanese translation printing section 223 and the Japanese-to-English translation printing section 224 respectively output the text data of Japanese and English translated sentences in predetermined forms to the printer section 7. The printer section 7 performs printing operation on the basis of the received data. FIG. 12 shows sentences printed by the English-to-Japanese translation printing section 223. FIG. 13 shows sentences printed by the Japanese-to-English translation printing section 224. Referring to FIGS. 12 and 13, the sentences on the left column are the original sentences, and those on the right column are the translated sentences. If the translation subsystem 22 determines that a translation result is not satisfactory, a mark "◊" is displayed at the head of the translated sentence.

(3) Dictionary Management Utilities 23

The dictionary management utilities 23 comprise the English-to-Japanese dictionary management section 231, the Japanese-to-English dictionary management section 232, the English morphological analysis dictionary management section 233, the Japanese morphological analysis dictionary management section 234, the bilingual correspondence parts analysis dictionary management section 235, and the dictionary database transmission and reception section 236.

■ English-to-Japanese Dictionary Management Section 231 and Japanese-to-English Dictionary Management Section 232

The English-to-Japanese dictionary management section 231 and the Japanese-to-English dictionary management section 232 respectively manage the English-to-Japanese dictionary 51 and the Japanese-to-English dictionary 52. That is, recording, deletion, and etc., of words with respect to the English-to-Japanese dictionary. 51 and the Japanese-to-English dictionary 52 are performed by the English-to-Japanese dictionary management section 231 and the Japanese-to-English dictionary management section 232.

■ English Morphological Analysis Dictionary Management Section 233 and Japanese Morphological Analysis Dictionary Management Section 234

The English morphological analysis dictionary management section 233 and the Japanese morphological analysis dictionary management section 234 respectively perform management (recording, display, and deletion) of the English morphological analysis dictionary 53 and the Japanese morphological analysis dictionary 54.

■ Bilingual Correspondence Parts Analysis Dictionary Management Section 235

The bilingual correspondence parts analysis dictionary management section 235 performs management (recording, display, and deletion) of the bilingual correspondence parts analysis dictionary 55 on which bilingual correspondence parts having undergone learning processing are recorded.

■ Dictionary Database Transmission and Reception Section 236.

Figure 14:
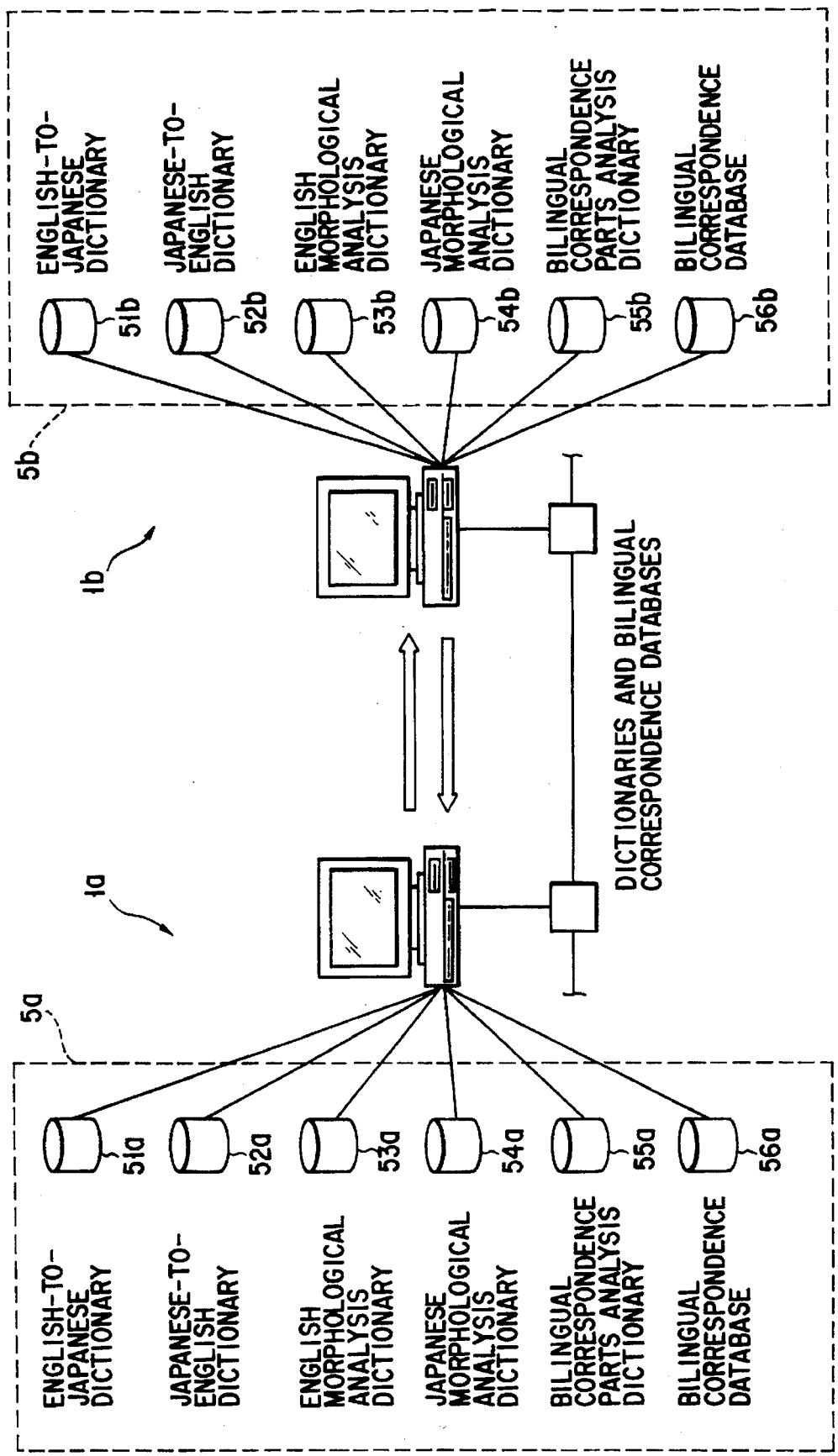
FIG. 14 is a view for explaining dictionary database transmission/reception processing in the transmission network of the machine translation systems shown in FIG. 4.

The dictionary database transmission and reception section 236 transmits/receives various information held in the dictionary database section 5 to/from another work station via the communication system 8. FIG. 14 shows the concept of dictionary database transmission/reception processing. Information to be transmitted/received is various information held in the database recording section 5, i.e., the English-to-Japanese dictionary 51, the Japanese-to-English dictionary 52, the English morphological analysis dictionary 53, the Japanese morphological analysis dictionary 54, the bilingual correspondence parts analysis dictionary 55, and the bilingual correspondence database 56. For example, various dictionaries and bilingual correspondence databases transmitted from a work station 1a to a work station 1b are added to a dictionary database 5b on the work station 1b side. In this case, of the received information, only information which is not recorded on the dictionary database 5b is written in the dictionary database 5b. With this operation, a write operation with respect to the dictionary database 5b can be performed within a short period of time.

Note that various dictionaries and bilingual correspondence databases can also be transmitted from the work station 1b to the work station 1a, or can be transmitted/ received between other work stations (not shown). With this operation, the dictionary database section 5 can be shared among a plurality of work stations, and the efficiency of bilingual correspondence learning and the like can be improved.

(4) Database Management Section 24

The database management section 24 performs access control for data held in the dictionary database section 5. For example, the database management section 24 performs access control for various data held in the bilingual correspondence database 56. Therefore, all accesses to data in the bilingual correspondence database 56 in a bilingual correspondence data recording operation, a bilingual correspondence learning operation, and a translating operation are performed through the database management section 24. Note that access to data in the bilingual correspondence database 56 in the above database transmission/ reception processing is performed by the dictionary database transmission and reception section 236.

The dictionary database section 5 will be described next.

As described above, the dictionary database section 5 comprises the English-to-Japanese dictionary 51, the Japanese-to-English dictionary 52, the English morphological analysis dictionary 53, the Japanese morphological analysis dictionary 54, the bilingual correspondence parts analysis dictionary 55, and the bilingual correspondence database 56. The bilingual correspondence parts analysis dictionary 55 serves to store bilingual correspondence parts having undergone learning processing. The bilingual correspondence database 56 serves to store bilingual correspondence data, English morphological information, Japanese morphological information, parts link information indicating the linking between the bilingual correspondence parts, and key data used for retrieval in translation processing. The English morphological information and the Japanese morphological information respectively indicate results obtained by decomposing character strings into parts of speech and the parts-of-speech information.

The operation of the machine translation system according to this embodiment will be described next with reference to the flow charts.

(Main Flow Chart)

FIG. 17 is a main flow chart showing the operation of the machine translation system according to this embodiment. When the system is activated, the operator can select desired processing from a menu screen displayed on the display section 4. If recording/ learning processing of bilingual correspondence data is selected by the operator (YES in step S1), the bilingual correspondence data record subsystem 21 executes the recording/learning processing of bilingual correspondence data (step S2). If the recording/ learning processing of bilingual correspondence data is not selected (NO in step S1), the mainframe 2 checks whether translation processing is selected (step S3). If the translation processing is selected (YES in step S3), the translation subsystem 22 executes the translation processing (step S4). If the translation processing is not selected (NO in step S3), the mainframe 2 checks whether dictionary management processing is selected (step S5). If the dictionary management processing is selected (YES in step S5), the dictionary management utilities 23 execute the dictionary management processing (step S6). If the dictionary management processing is not selected (NO in step S5), the processing of the main flow chart is terminated.

(Recording/Learning Processing of Bilingual Correspondence Data)

Figure 18:
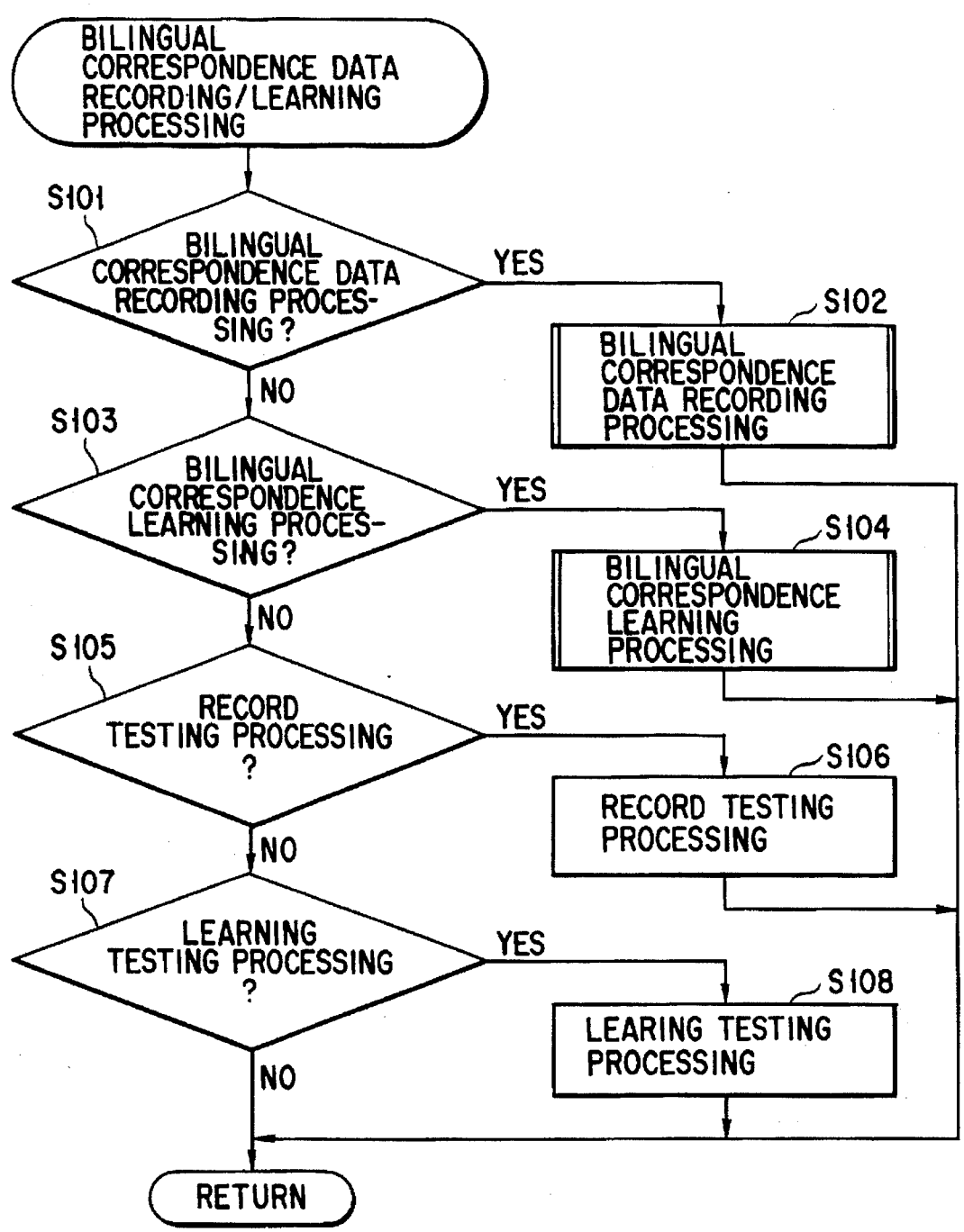
FIG. 18 is a flow chart showing bilingual correspondence data recording/learning processing in the main flow chart shown in FIG. 17.

FIG. 18 is a flow chart showing the recording/learning processing of bilingual correspondence data (step S2) in FIG. 17. Upon selecting the recording/learning processing, the operator can select any one of bilingual correspondence data recording processing, bilingual correspondence learning processing, record testing processing, and learning testing processing while watching a predetermined menu displayed on the display section 4. If the bilingual correspondence data recording processing is selected by the operator (YES in step S101), the bilingual correspondence data recording section 211 performs bilingual correspondence data recording by using English and Japanese translated sentences (step S102). The bilingual correspondence data generated by this processing is stored in the bilingual correspondence database 56. If the same sentence (words and phrases) as the bilingual correspondence data is present in a sentence as a translation target in the subsequent translation processing, the same translated sentence as the bilingual correspondence data is output.

If the bilingual correspondence data recording processing is not selected (NO in step S101), the mainframe 2 checks whether the bilingual correspondence learning processing is selected (step S103). If the bilingual correspondence learning processing is selected (YES in step S103), the bilingual correspondence learning section 212 executes the bilingual correspondence learning processing (step S104). That is, the bilingual correspondence learning section 212 decomposes the bilingual correspondence data into parts, and links the parts of the English sentence with the parts of the Japanese sentence. With this operation, natural translation of a sentence which is similar to the bilingual correspondence data can be performed in the subsequent translation processing.

If the bilingual correspondence learning processing is not selected (NO in step S103), the mainframe 2 checks whether the record testing processing is selected (step S105). If the record testing processing is selected (YES in step S105), the record testing section 213 executes the record testing processing (step S106). That is, the record testing section 213 performs management (maintenance) processing such as display, deletion, addition, and retrieval of the recorded bilingual correspondence data.

If the record testing processing is not selected (NO in step S105), the mainframe 2 checks whether the learning testing processing is selected (step S107). If the learning testing processing is selected (YES in step S107), the learning testing section 214 executes the learning testing processing (step S108). That is, the learning testing section 214 performs management processing such as display, deletion, addition, and retrieval of the recorded parts link information. When the above processing is completed, the flow returns to the main flow chart in FIG. 17.

(Translation)

Figure 19:
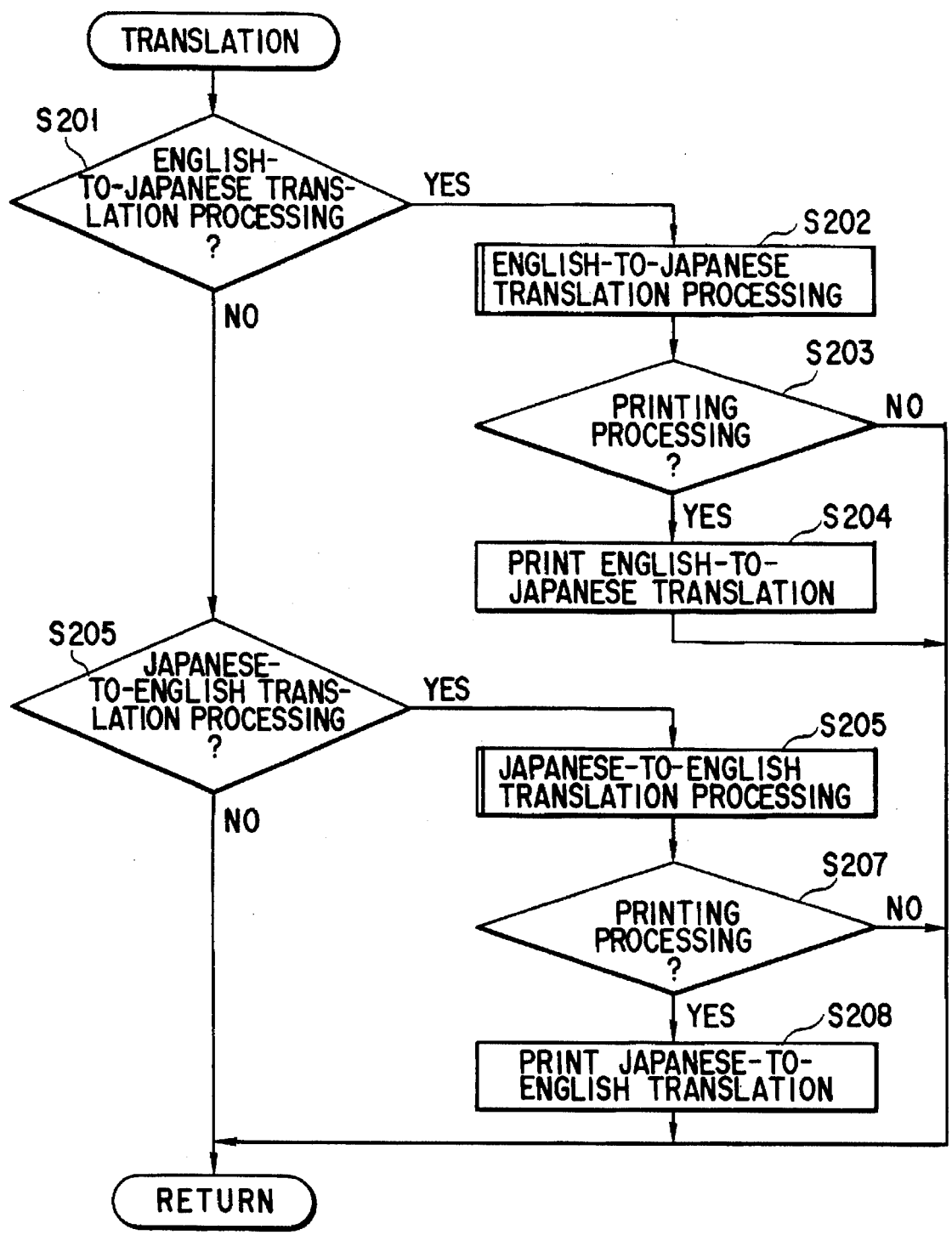
FIG. 19 is a flow chart explaining translation processing in the flow chart shown in FIG. 17.

FIG. 19 is a flow chart showing the translation processing (step S4) in FIG. 17. The operator can select either English-to-Japanese translation processing or Japanese-to-English translation processing while watching a menu displayed on the display section 4. If the English-to-Japanese translation processing is selected by the operator (YES in step S201), the English-to-Japanese translation section 221 performs English-to-Japanese translation processing on the basis of bilingual correspondence data and parts link information (step S202). When the translation is completed, the operator can designate printing of the translation result. The mainframe 2 receives a command from the operator via the input section 3, and checks this command (step S203). If a command for printing the translation result is received (YES in step S203), the English-to-Japanese translation printing section 223 outputs the translation result to the printer section 7. As a result, printing is performed by the printer section 7 according to a form like the one shown in FIG. 12. If a command for not printing the translation result is received (NO in step S203), the flow returns to the main flow chart in FIG. 17 without performing a printing operation.

If the English-to-Japanese translation processing is not selected (NO in step S201), the mainframe 2 checks whether the Japanese-to-English translation processing is selected (step S205). If the Japanese-to-English translation processing is selected (YES in step S205), the Japanese-to-English translation section 222 performs Japanese-to-English translation on the basis of bilingual correspondence data and parts link information (step S206). When the translation is completed, the mainframe 2 checks whether the command from the operator is a command for printing the translation result (step S207). If the command for printing the translation result is received (YES in step S207), the Japanese-to-English translation printing section 224 outputs the translation result to the printer section 7. As a result, printing is performed according to a form like the one shown in FIG. 13. If a command for not printing the translation result is received (NO in step S207), the flow returns to the main flow chart in FIG. 17 without performing a printing operation.

(Dictionary Management)

Figure 20:
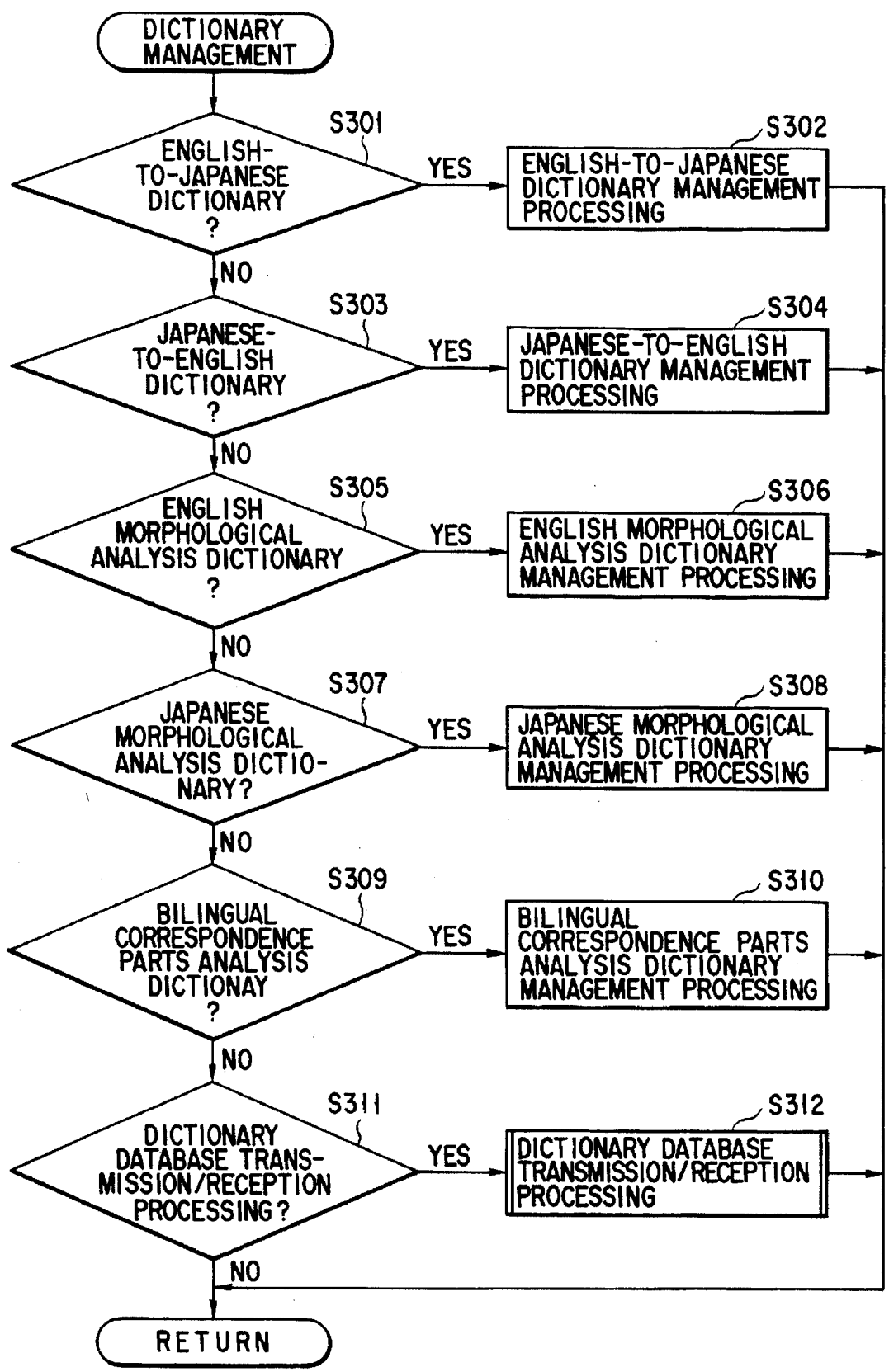
FIG. 20 is a flow chart explaining dictionary management processing in the main flow chart shown in FIG. 17.
Figure 21A:
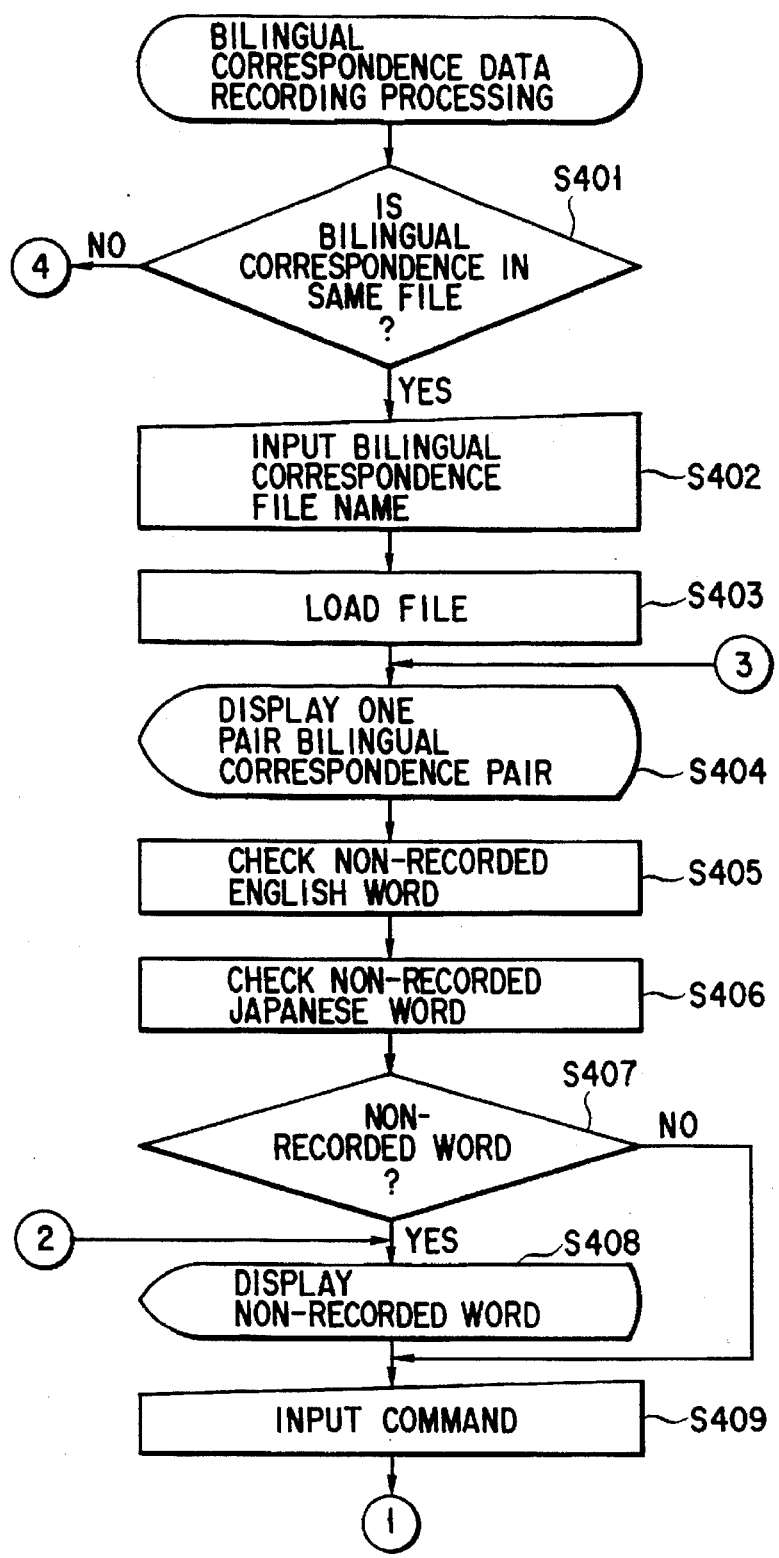
FIGS. 21A to 21D are flow charts explaining bilingual correspondence data recording processing upon selection of bilingual correspondence data recording in the flow chart shown in FIG. 17.
Figure 21B:
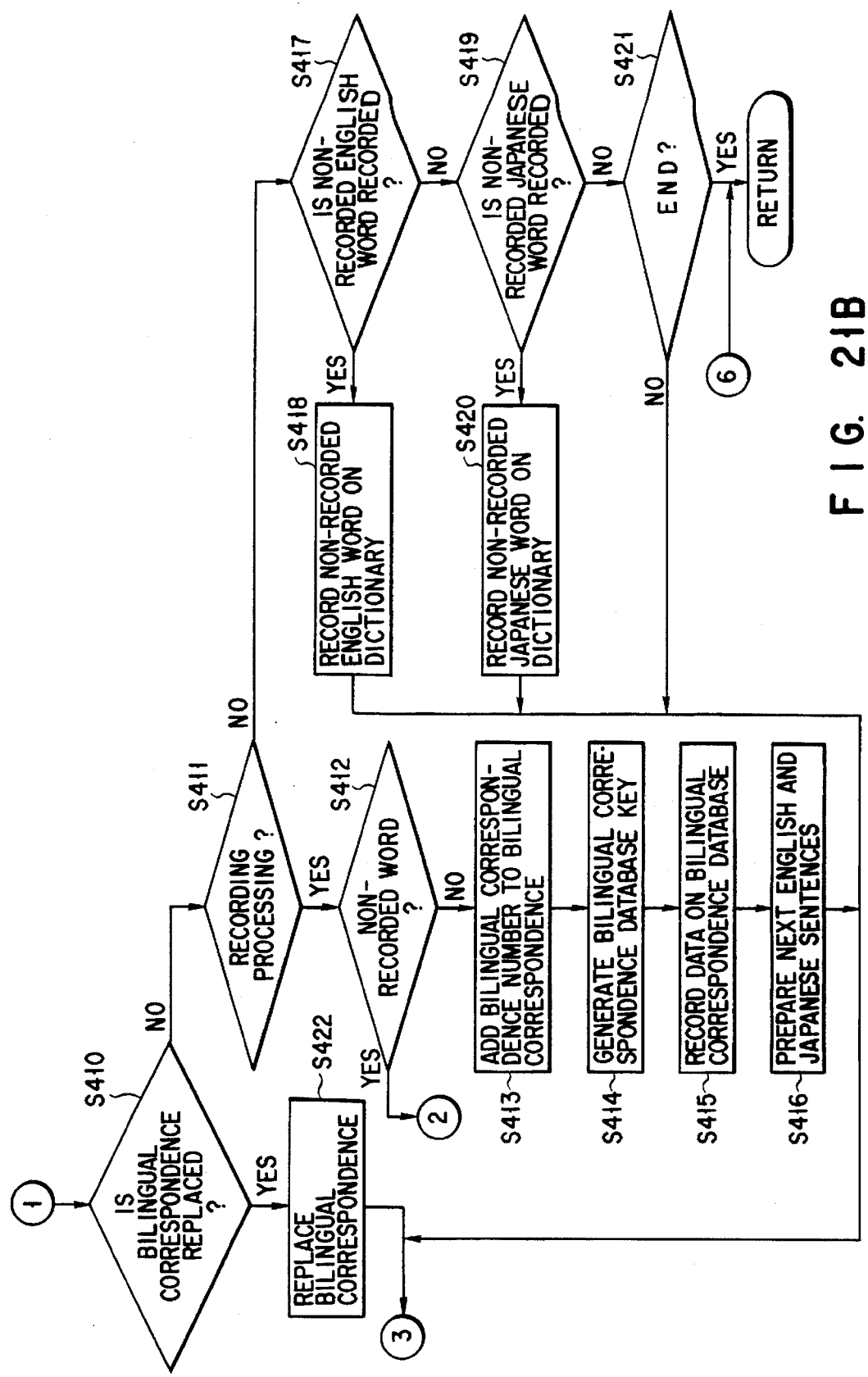
Figure 21C:
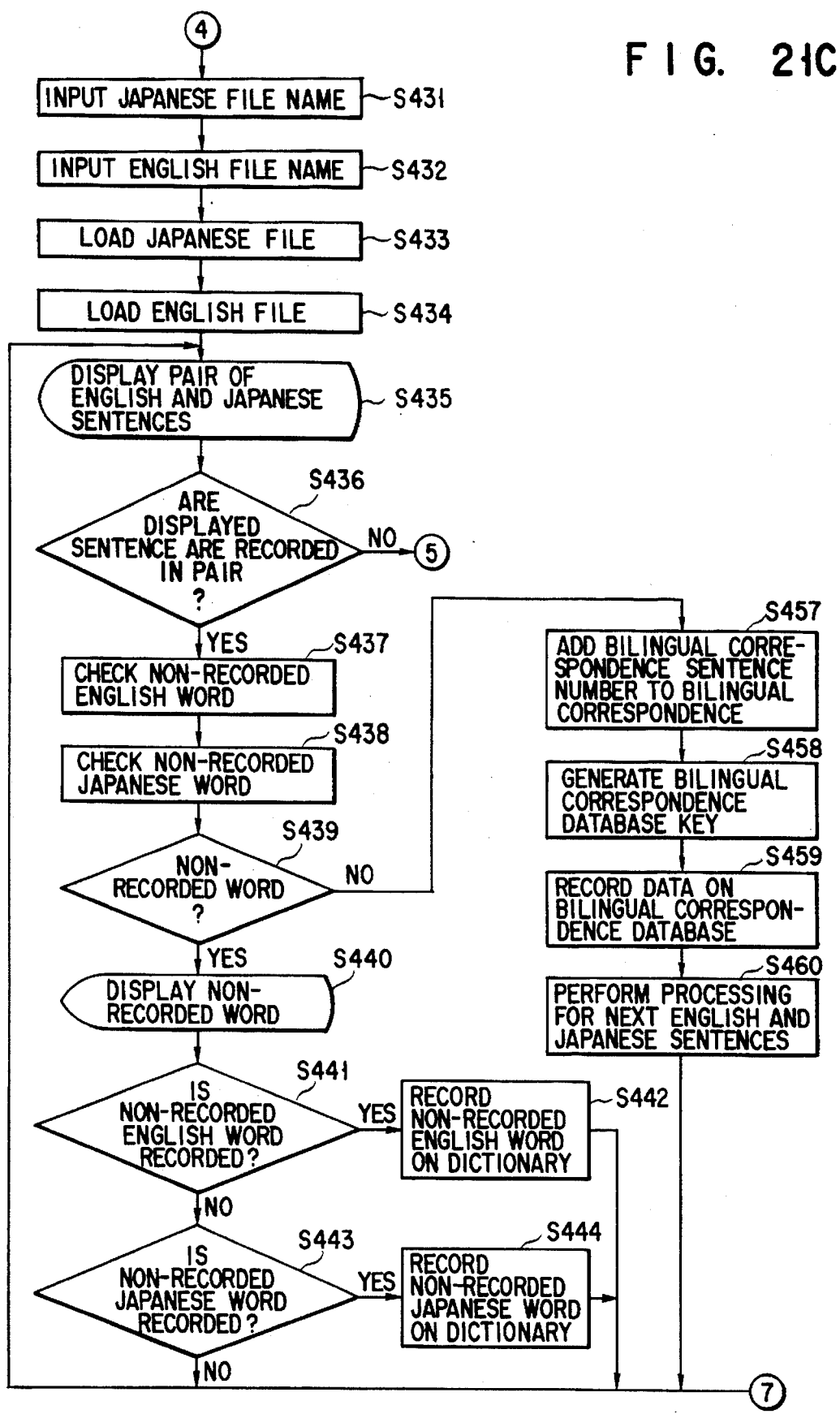
Figure 21D:
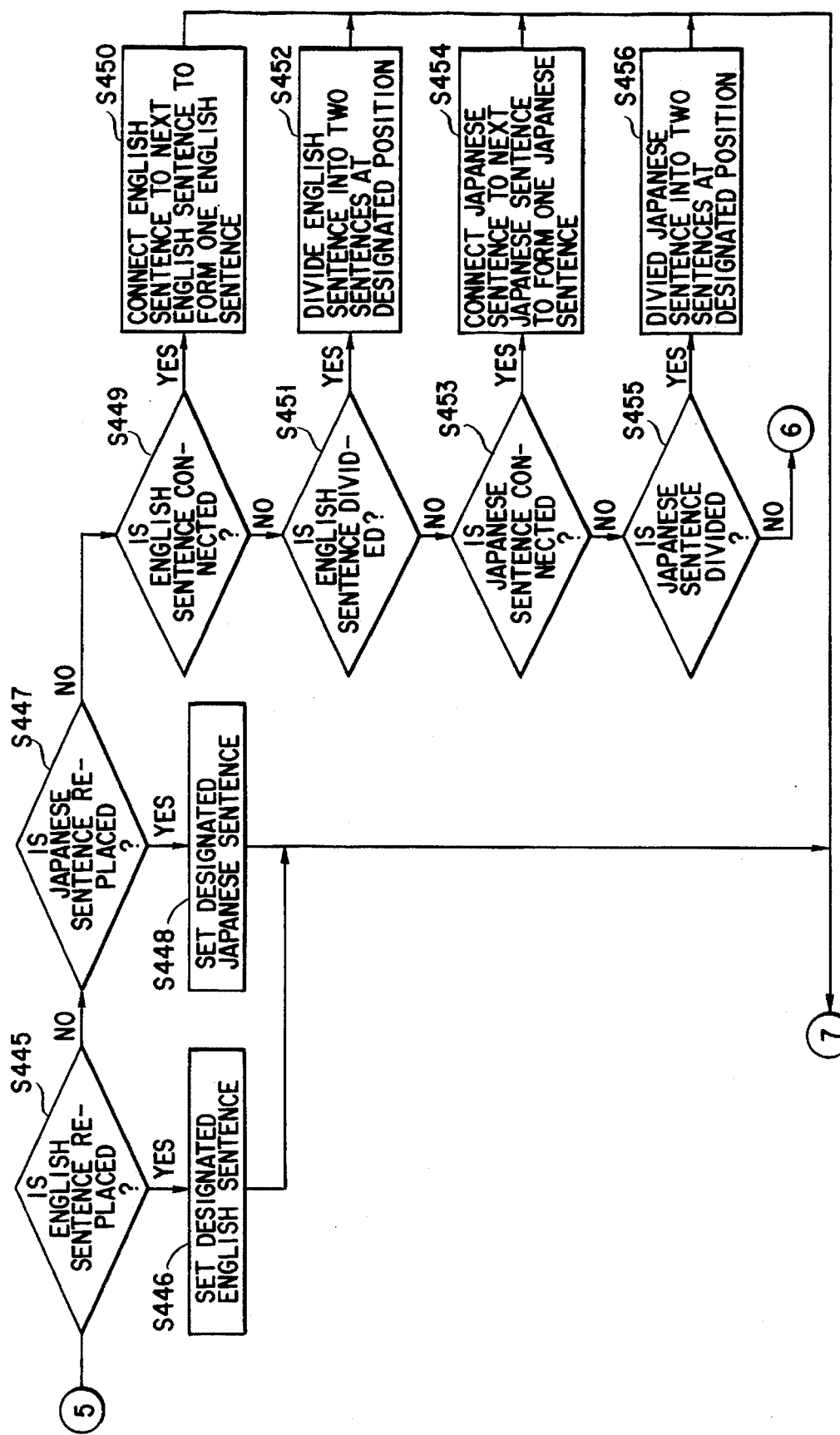

FIG. 20 is a flow chart showing the dictionary management processing (step S6) in FIG. 17. The operator can select any of English-to-Japanese dictionary management processing, Japanese-to-English dictionary management processing, English morphological analysis dictionary management processing, Japanese morphological analysis dictionary management processing, bilingual correspondence parts analysis dictionary management processing, and dictionary database transmission/reception processing while watching a menu displayed on the display section 4. If the English-to-Japanese dictionary management processing is selected by the operator (YES in step S301), the English-to-Japanese dictionary management section 231 performs recording, display, deletion, retrieval, and the like with respect to the English-to-Japanese dictionary 51 (step S302). If the English-to-Japanese dictionary management processing is not selected (NO in step S301), the mainframe 2 checks whether the Japanese-to-English dictionary management processing is selected (step S303). If the Japanese-to-English dictionary management processing is selected (YES in step S303), the Japanese-to-English dictionary management section 232 performs recording, display, deletion, retrieval, and the like with respect to the Japanese-to-English dictionary 52 (step S304).

If the Japanese-to-English dictionary management processing is not selected (NO in step S303), the mainframe 2 checks whether the English morphological analysis dictionary management processing is selected (step S305). If the English morphological analysis dictionary management processing is selected (YES in step S305), the English morphological analysis dictionary management section 233 performs recording, display, deletion, retrieval, and the like with respect to the English morphological analysis dictionary 53 (step S306). Similarly, if the Japanese morphological analysis dictionary management processing is selected (YES in step S307), the Japanese morphological analysis dictionary management section 234 performs recording, display, deletion, retrieval, and the like with respect to the Japanese morphological analysis dictionary 54 (step S308). If the bilingual correspondence parts analysis dictionary management processing is selected (YES in step S309), the bilingual correspondence parts analysis dictionary management section 235 performs recording, display, deletion, retrieval, and the like with respect to the bilingual correspondence parts analysis dictionary 55 (step S310).

If the dictionary database transmission/reception processing is selected (YES in step S311), the dictionary database transmission and reception section 236 performs transmission/reception processing of various dictionaries and bilingual correspondence databases (step S312). That is, the dictionary database transmission and reception section 236 transmits various information in the English-to-Japanese dictionary 51, the Japanese-to-English dictionary 52, the English morphological analysis dictionary 53, the Japanese morphological analysis dictionary 54, the bilingual correspondence parts analysis dictionary 55, and the bilingual correspondence database 56 to another machine translation system (work station), as shown in FIG. 14. With this processing, the dictionary databases of the respective work stations connected to each other can be shared among them.

(Detailed Description of Bilingual Correspondence Data Recording)

FIGS. 21A to 21D are flow charts showing the bilingual correspondence data recording processing (step S102 in FIG. 18) in detail.

In performing bilingual correspondence data recording processing, if English and Japanese sentences to be subjected to the processing are present in the same file (YES in step S401), the mainframe 2 receives a command from the operator, i.e., the name of a Japanese/English document file having the English and Japanese sentences, via the input section 3 (step S402). The mainframe 2 loads the Japanese/English document file 61 on the basis of the input file name (step S403), and displays the pair of English and Japanese sentences on the display section 4, as shown in FIG. 6 (step S404). The bilingual correspondence data recording section 211 checks whether the displayed English sentence includes a word which is not recorded on the English morphological analysis dictionary 53 (step S405). Similarly, the bilingual correspondence data recording section 211 checks whether the displayed Japanese sentence includes a word which is not recorded on the Japanese morphological analysis dictionary 54 (step S406). If there are non-recorded words (YES in step S407), the bilingual correspondence data recording section 211 displays the non-recorded words on the non-recorded English word display column 103 and the non-recorded Japanese word display column 104 (FIG. 6), respectively (step S408) with this operation, the operator can easily recognize the non-recorded words.

Subsequently, the bilingual correspondence data recording section 211 responds to a predetermined command input (step S409), and checks whether bilingual correspondence data recording Of other English and Japanese sentences is performed (step S410). If bilingual correspondence data recording of other English and Japanese sentences is to be performed (YES in step S410), the bilingual correspondence data recording section 211 selects new English and Japanese sentences (step S422), and executes the processing in step S404 and the subsequent steps. If the displayed English and Japanese sentences need not be replaced with other English and Japanese sentences (NO in step S410), the bilingual correspondence data recording section 211 receives a command from the operator, and checks whether this command is a command for recording the displayed English and Japanese sentences as bilingual correspondence data (step S411). If bilingual correspondence data recording is to be performed (YES in step S411), the bilingual correspondence data recording section 211 executes the processing in step S412 and the subsequent steps. If bilingual correspondence data recording is not performed, the bilingual Correspondence data recording section 211 executes the processing in step S417 and the subsequent steps.

If it is determined in step S412 that the English and Japanese sentences include non-recorded words (YES in step S412), the flow returns to step S408 in which the bilingual correspondence data recording section 211 displays the non-recorded words. If the English and Japanese sentence include no non-recorded words (NO in step S412), the bilingual correspondence data recording section 211 generates a bilingual correspondence number unique to the English and Japanese sentences, and adds the bilingual correspondence number to the bilingual correspondence data of the English and Japanese sentences (step S413). The bilingual correspondence data recording section 211 generates key data for retrieving the bilingual correspondence data of the English and Japanese sentences (step S414), and records the English and Japanese sentences as the bilingual correspondence data on the bilingual correspondence database 56, together with this key data (step S415). Thereafter, the bilingual correspondence data recording section 211 prepares other English and Japanese sentences from the Japanese/English document file 61 (step S416) and displays them on the display section 4 (step S404). Subsequently, the processing in step S405 and the subsequent steps is repeated.

If it is determined in step S411 that recording is not performed, the bilingual correspondence data recording section 211 checks whether the command from the operator is a command for recording the non-recorded English word displayed on the non-recorded English word display column 103 (step S417). If the non-recorded English word is to be recorded (YES in step S417), the bilingual correspondence data recording section 211 records the non-recorded English word on the English morphological analysis dictionary 53 (step S418), and the flow returns to step S404. If the non-recorded English word is not recorded (NO in step S417), it is checked whether the command from the operator is a command for recording the non-recorded Japanese word (step S419). If the non-recorded Japanese word is to be recorded (YES in step S419), the bilingual correspondence data recording section 211 records the non-recorded Japanese word on the Japanese morphological analysis dictionary 54 (step S420), and the flow returns to step S404. If the non-recorded Japanese word is not recorded (NO in step S419), it is checked whether the command from the operator is a command for terminating the bilingual correspondence data recording processing (step S421). If the input command is a command for not terminating the bilingual correspondence data recording processing (NO in step S421), the bilingual correspondence data recording section 211 executes the processing in step S404 and the subsequent steps. If the bilingual correspondence data recording processing is to be terminated (YES in step S421), all the bilingual correspondence data recording processing is terminated.

The processing in step S431 and the subsequent steps is executed if English and Japanese sentences to be subjected to bilingual correspondence data recording processing are present in different files (NO in step S401). The mainframe 2 receives an English file name and a Japanese file name from the operator via the input section 3 (steps S431 and S432). The mainframe 2 reads out the English and Japanese files 62 and 63 from the document files 6 on the basis of the designated file names (steps S433 and S434). The English and Japanese sentences in the readout English and Japanese files 62 and 63 are displayed on the display section 4 (step S435).

For example, as shown in FIG. 7, the English sentence 106 "Selectively plated with minimum of 150 micro inches of silver on the bonding area, measured as in section 6.3.1." and the Japanese sentence 107 "<6. 3. 1 NO KOU NO KEISANHOUHOU NIYORI, BONDYENGU SARERU BUBUNNI GINMEKKIGA SAITEI 150 MAIKUROIN-CHI NO ATSUSADE BUBUNMEKKIGA HODOKOSA-RETEIRUKOTO>" are displayed in pair. If it is determined that the command from the operator is a command for recording the pair of English and Japanese sentences 106 and 107 as bilingual correspondence data without any modification (YES in step S436), the bilingual correspondence data recording section 211 executes the processing in step S437 and the subsequent steps. If it is determined that the command from the operator is a command for not recording the pair of English and Japanese sentences (NO in step S436), the bilingual correspondence data recording section 211 executes the processing in step S445 and the subsequent steps.

In step S437, the bilingual correspondence data recording section 211 checks whether the English sentence 106 includes a word which is not recorded on the English morphological analysis dictionary 53. Similarly, the bilingual correspondence data recording section 211 checks whether the Japanese sentence 107 includes a word which is not recorded on the Japanese morphological analysis dictionary 54 (step S438). If the English and Japanese sentences 106 and 107 include non-recorded words (YES in step S439), the bilingual correspondence data recording section 211 displays the non-recorded words on the display section 4 (step S440). Thereafter, the bilingual correspondence data recording section 211 receives a command from the operator, and checks whether this command is a command for recording the non-recorded English word (step S411). If the received command is a command for recording the non-recorded English word (YES in step S441), the bilingual correspondence data recording section 211 records the non-recorded English word on the English morphological analysis dictionary 53 (step S442), and the flow returns to step S435. If it is determined that the non-recorded English word is not recorded (NO in step S441), the bilingual correspondence data recording section 211 receives a command from the operator, and checks whether the command is a command for recording the non-recorded Japanese word (step S443). If the command from the operator is a command for recording the non-recorded Japanese word (YES in step S443), the bilingual correspondence data recording section 211 records the non-recorded Japanese word on the Japanese morphological analysis dictionary 54 (step S444), and the flow returns to step S435. If the command from the operator is a command for not recording the non-recorded Japanese word (No in step S443), the non-recorded word is not recorded, and the flow returns to step S435.

If the bilingual correspondence data recording section 211 determines in step S439 that there are no non-recorded words, the processing in step S457 and the subsequent steps is executed. That is, the bilingual correspondence data recording section 211 generates a bilingual correspondence sentence number unique to the English and Japanese sentences, and adds it to the bilingual correspondence data of the English and Japanese sentence (step S457). The bilingual correspondence data recording section 211 generates key data for retrieving the bilingual correspondence data of the English and Japanese sentences (step S458), and records the English and Japanese sentences as bilingual correspondences data on the bilingual correspondence database 56, together with this key data (step S459). Thereafter, the operator can select other displayed English and Japanese sentences. The bilingual correspondence data recording section 211 executes the processing in step S435 and the subsequent steps in accordance with a command from the operator (step S460).

If it is determined in step S436 that the command from the operator is a command for not recording the displayed bilingual correspondence of the English and Japanese sentences (NO in step S436), another English sentence is selected upon input of the command 108 (steps S445 and S446). Similarly, another Japanese sentence is selected upon input of the above command (steps S447 and S448). If the command is a command for designating that the English and Japanese sentences are not replaced (NO in steps S445 and S447), the bilingual correspondence data recording section 211 executes the processing in step S449 and the subsequent steps.

In step S449, the bilingual correspondence data recording section 211 checks whether an English sentence 106 is to be connected to another English sentence in accordance with a command from the operator (step S449). If the English sentence 106 is to be connected to another English sentence (YES in step S449), the bilingual correspondence data recording section 211 connects the English sentence 106 to an English sentence 109 following the English sentence 106 (step S450), and executes the processing in step S435 and the subsequent steps. If the English sentence 106 is to be divided (YES in step S451), the bilingual correspondence data recording section 211 divides the English sentence 106 at a designated position (step S452), and executes the processing in step S435 and the subsequent steps.

In addition, the bilingual correspondence data recording section 211 performs the same processing as described above with respect to the Japanese sentence in accordance with a command from the operator. If the command of the operator is a command for connecting the Japanese sentence 107 to a Japanese sentence 110 following the Japanese sentence 107 (YES in step S435), the bilingual correspondence data recording section 211 connects the Japanese sentence 107 to the Japanese sentence 110 (step S454), and executes the processing in step S435 and the subsequent steps. If the command is an instruction for dividing the Japanese sentence 107 at a predetermined position (YES in step S455), the bilingual correspondence data recording section 211 divides the Japanese sentence 107 at the predetermined position (step S456), and executes the processing in step S435 and the subsequent steps. Therefore, desired portions of the English and Japanese sentences 106 and 107 can be recorded as bilingual correspondence data, or a plurality of English sentences and a plurality of Japanese sentences can be connected to each other to be recorded as bilingual correspondence data. If the command from the operator is a command for not connecting/dividing the English and Japanese sentences 106 and 107 (NO in steps S449, S451, S453, and S455), the bilingual correspondence data recording processing is terminated.

(Detailed Description of Bilingual Correspondence Data Learning Processing)

Figure 22:
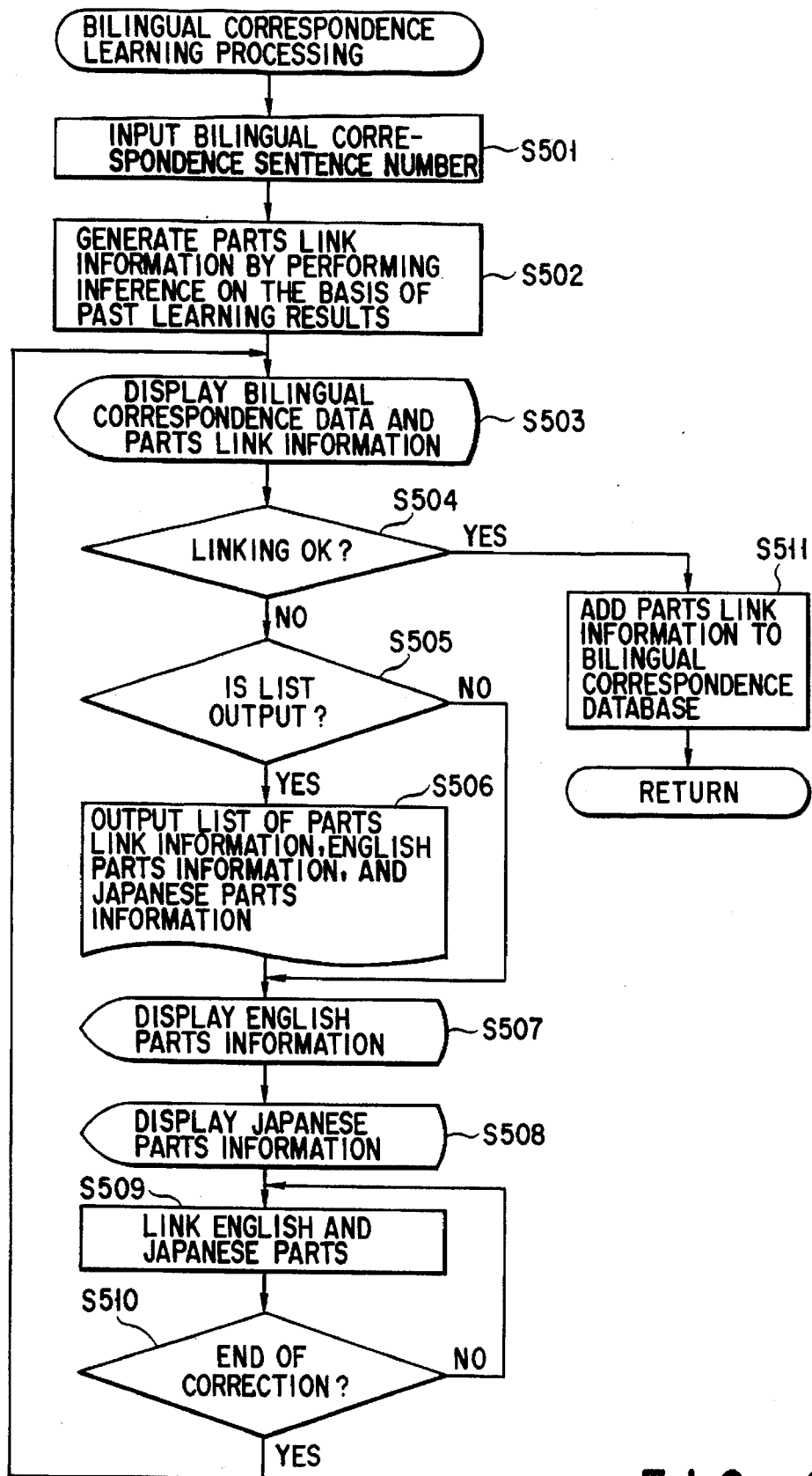
FIG. 22 is a flow chart for explaining bilingual correspondence learning processing upon selection of bilingual correspondence learning in the flow chart shown in FIG. 18.

FIG. 22 is a flow chart showing the bilingual correspondence learning processing (step S104 in FIG. 18) in detail.

The mainframe 2 receives a bilingual correspondence sentence number from the operator via the input section 3 (step S501). This bilingual correspondence sentence number is a unique number attached to sentences recorded as bilingual correspondence data. If, for example, bilingual correspondence sentence number 3646 is input, as shown in FIG. 8, the mainframe 2 displays the English and Japanese sentences 111 and 112 on the display section 4.

The bilingual correspondence learning section 212 performs parts linking of the English and Japanese sentences 111 and 112 on the basis of past learning results (bilingual correspondence parts analysis dictionary 55). That is, the bilingual correspondence learning section 212 automatically links the English and Japanese sentences 111 and 112 in units of parts to generate the parts link information 113. In this case, if the same parts as bilingual correspondence parts recorded on the bilingual correspondence parts analysis dictionary 55 are present in the English and Japanese sentences 111 and 112, the parts link information 113 is generated on the basis of the recorded bilingual correspondence parts. If the English and Japanese sentences 111 and 112 include parts which are not recorded on the bilingual correspondence parts analysis dictionary 55, the bilingual correspondence learning section 212 generates the parts link information 113 by using words recorded on the English-to-Japanese dictionary 51 and the Japanese-to-English dictionary 52 (step S502).

The generated parts link information 113 is displayed on the display section 4 (step S503). By referring to this display, the operator can check whether the parts link information is correct. If "y" is input on a display column 114, the bilingual correspondence learning section 212 determines that the parts link information 113 is properly generated (YES in step S504). With this processing, the bilingual correspondence learning section 212 automatically adds/records the parts link information 113 on the bilingual correspondence database 56 (step S511). If a new part (non-recorded part) is designated, this part is added/recorded on the bilingual correspondence parts analysis dictionary, and the bilingual correspondence learning processing is terminated.

If the parts link information 113 is not properly generated, the operator inputs "n" on the display column 114. In response to this input from the operator, the bilingual correspondence learning section 212 recognizes that the parts link information 113 is not properly generated (NO in step S504), and executes the processing in step S505 and the subsequent steps. In step S505, if "y" is input on a display column 115, the bilingual correspondence learning section 212 determines that the command from the operator is a command for displaying a parts link list (YES in step S505). As a result, a list of parts link information, English parts information, and Japanese parts information is output from the printer section 7. If, for example, the English and Japanese sentences 111 and 112 include parts which have not been linked in past learning processing, information like <<3: with ****>> is displayed in the parts link information 113. By seeing this display, the operator can recognize the parts which have not been linked.

Even if no parts link list is to be output (NO in step S505), the English parts information 116 and the Japanese parts information 117 are displayed on the display section 4 (steps S507 and S508). The operator recognizes items to be corrected while watching this display or a printed-out list, and can designate how to link English and Japanese parts with each other. The bilingual correspondence learning section 212 receives the parts linking command from the operator, and performs linking processing in accordance with the command (step S509).

For example, in the display shown in FIG. 8, [3: with] and [13: measured 14: as] are not linked. Therefore, the operator inputs the ordinal number "3" of the part [3: with] and the ordinal numbers "16" and "17" of the corresponding parts [16: <ATUSA>] and [17: <DE>] (see reference numeral 118). Similarly, the operator inputs the ordinal numbers "13" and "14" of the parts [13: measured] and [14: as] and the ordinal numbers "3", "4", and "5" of the corresponding parts [3: <KEISOKU>], [4: <HOUHOU>], AND [5: <NIYORI>] (see reference numeral 119).

If the operator inputs the ordinal number "3" of the part [3: with] in the column "English link" and no number in the column "Japanese link", the part [3: with] is not linked with any part.

The processing in step S509 is repeatedly executed until correction of the parts link information 113 is completed (YES in step S510). After correction of the displayed parts link information 113 is completed, the processing in step S503 and the subsequent steps is repeated, thereby executing processing such as display and recording of the parts link information after correction.

(Detailed Description of English-to-Japanese Translation Processing)

Figure 23:
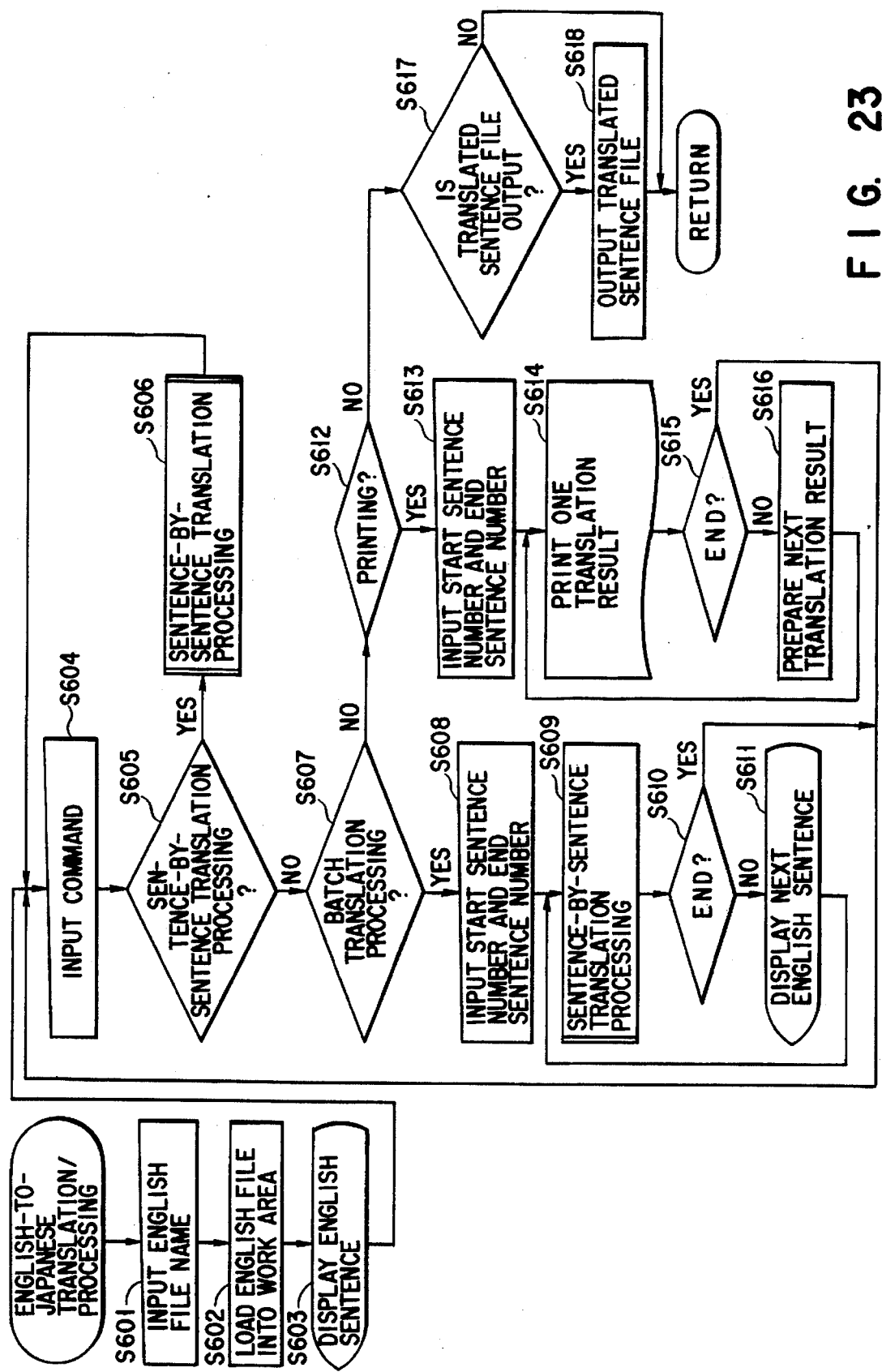
FIG. 23 is a flow chart explaining English-to-Japanese translation processing upon selection of English-to-Japanese translation processing in the flow chart shown in FIG. 19.

FIG. 23 is a flow chart showing the English-to-Japanese processing (step S202 in FIG. 19) in detail. The mainframe 2 receives a file name designated by the operator, i.e., an English file name to be subjected to translation processing, via the input section 3 (step S601). The mainframe 2 loads an English file corresponding to this English file name into the work area of the internal memory (step S602), and displays the loaded English file on the display section 4 (step S603).

The operator can designate either sentence-by-sentence translation or batch translation by referring to a screen displayed on the display section 4. The mainframe 2 receives a command from the operator (step S604), and determines in accordance with this input whether to perform sentence-by-sentence translation or batch translation. If original sentences are to be translated sentence by sentence (YES in step S605), one sentence is translated by the processing in step S606, and the processing in step S604 and the subsequent steps is repeated.

If the original sentences are to be translated altogether (YES in step S607), the English-to-Japanese translation section 221 receives a sentence number at which translation is started (translation start sentence number) and a sentence number at which translation is ended (translation end sentence number) designated by the operator (step S608). First of all, the English-to-Japanese translation section 221 translates one sentence at the translation start sentence number into Japanese (step S609). The English-to-Japanese translation section 221 then checks whether translation of an English sentence at the translation end sentence number is completed (step S610). If the translation is completed (YES in step S610), the English-to-Japanese translation section 221 repeatedly executes the processing in step S604 and the subsequent steps. If the translation of the English sentence at the translation end sentence number is not completed (NO in step S610), the English-to-Japanese translation section 221 displays the second English sentence (step S611), and repeatedly executes the processing in step S609 and the subsequent steps. In this manner, a plurality of English sentences from the translation start sentence number to the translation end sentence number can be translated into Japanese sentences altogether.

If it is determined in step S607 that the command is a command for not performing batch translation (NO in step S607), it is checked whether the command is a command for printing the translation result (step S612). If the translation result is to be printed (YES in step S612), the English-to-Japanese translation printing section 223 receives a printing start sentence number and a printing end sentence number from the operator. The English-to-Japanese translation printing section 223 outputs the first translation result (English and translated Japanese sentences) at the printing start sentence number to the printer section 7. The printer section 7 prints the first translated result in a predetermined form (step S614). The English-to-Japanese translation printing section 223 continues to print translation results until printing of the translation result at the printing end sentence number is completed (YES in step S615). When printing of the translation result at the printing end sentence number is completed (YES in step S615), the processing in step S604 and the subsequent steps is executed.

If it is determined in step S612 that the command is not a printing command (NO in step S612), it is checked whether the command is a command for outputting the translated sentence to a file (step S617). If the translated sentence is to be output to the file (YES in step S617), the mainframe 2 outputs the translated sentence to the file, and the flow returns to the flow chart shown in FIG. 19.

Figure 24:
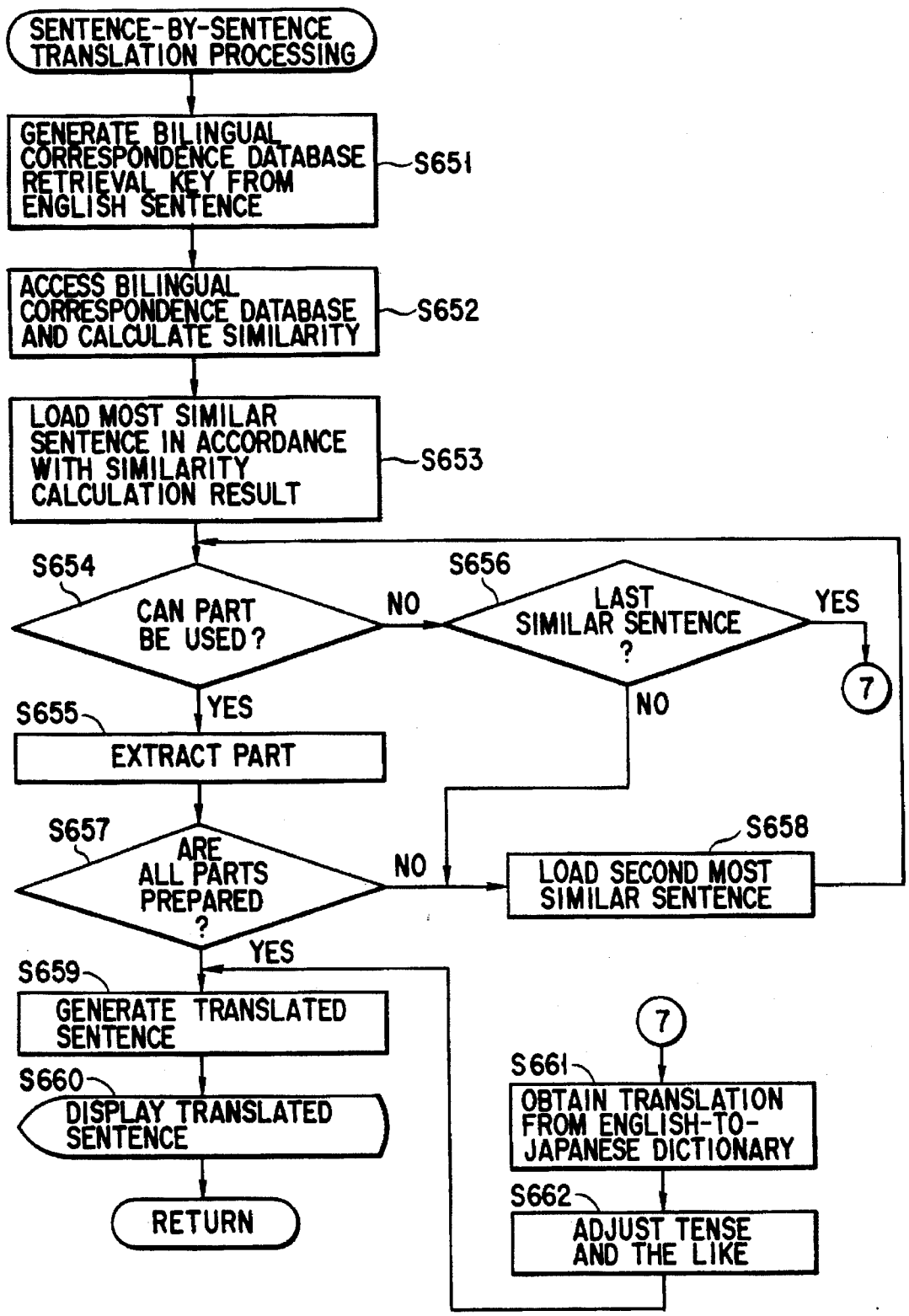
FIG. 24 is a flow chart showing detailed sentence-by-sentence translation processing in the flow chart shown in FIG. 23.

FIG. 24 is a flow chart showing the sentence-to-sentence translation in steps S606 and S609. The English-to-Japanese translation section 221 generates key data for an original sentence supplied as a translation target (step S651). The key data is data for retrieval from the bilingual correspondence database 56. The English-to-Japanese translation section 221 retrieves bilingual correspondence data including an English sentence which is most similar to the original sentence from the bilingual correspondence data in the bilingual correspondence database 56 in accordance with the key data (step S652), and loads this bilingual correspondence data into a predetermined work memory (step S653).

Assume that an original sentence 141 [When I fell into the river he came to my aid.] is supplied, as shown in FIG. 15A. The English-to-Japanese translation section 221 retrieves the English sentence which is most similar to an original sentence 141 from the bilingual correspondence database 56, and detects bilingual correspondence data 142. That is, the bilingual correspondence data 142 having an English sentence [When it came to voting, he abstained] is retrieved.

The English-to-Japanese translation section 221 checks parts of the bilingual correspondence data 142 which coincide with parts of the original sentence 141. That is, the English-to-Japanese translation section 221 checks whether the bilingual correspondence data 142 includes parts which can be used for translation of the original sentence 141 (step S654). If it is determined that parts which can be used for translation are present in the bilingual correspondence data 142 (YES in step S654), these parts are loaded into the work area of the internal memory (step S655). Of the parts of the bilingual correspondence data 142, the two parts [When] and [he] can be used for translation.

Subsequently, the English-to-Japanese translation section 221 checks whether all the parts in the original sentence 141 are prepared (step S657). In this case, of the parts of the original sentence 141, the parts [I fell into the river] and [came to may aid] are not prepared (not translated) (NO in step S657). Therefore, the English-to-Japanese translation section 221 reads out bilingual correspondence data 143 having the English sentence which is the second most similar to the original sentence 141 from the bilingual correspondence database 56 (step S658). Of the parts link information of the bilingual correspondence data 143, the two parts [came] and [to my aid] coincide with parts of the original sentence 141 (step S654). Therefore, the English-to-Japanese translation section 221 loads these two parts into the work area (step S655), and checks whether all the parts of the original sentence 141 are prepared (step S657). In this case, since the part [I fell into the river] of the parts of the original sentence 141 is not prepared (NO in step S657), the English-to-Japanese translation section 221 loads bilingual correspondence data 144 having the English sentence which is the third most similar to the original sentence 141 (step S658).

Of the parts link information of the bilingual correspondence data 144 (FIG. 15C), only the part [I] coincides with a part of the original sentence 141, but a part coinciding with the part [fell into the river] of the original sentence 141 has not been retrieved yet. In addition, the English-to-Japanese translation section 221 loads bilingual correspondence data 145 having the English sentence which is fourth most similar to the original sentence 141, and searches for a part which can be used. As a result, all the parts of the original sentence 141 are prepared, and Japanese parts 146 corresponding to the respective English parts of the original sentence 141 are generated. The English-to-Japanese translation section 221 rearranges the Japanese parts 146 to generate and display a translated sentence 147 (steps S659 and S660).

If it is determined in step S654 that the parts link information of the loaded bilingual correspondence data includes no parts which can be used (NO in step S654), and there is no bilingual correspondence data having an English sentence which is similar to the original sentence 141 (YES in step S656), English-to-Japanese translation is performed on the basis of the English-to-Japanese dictionary 51 (step S661). That is, the English-to-Japanese translation section 221 loads Japanese translations of parts (in units of words in this case), for which no bilingual correspondences have been retrieved, of the parts of the original sentence 141 from the English-to-Japanese dictionary 51, thereby completing a translated sentence of the original sentence 141. When the translated sentence of the original sentence 141 is completed with the above processing, the flow returns to the flow chart in FIG. 23.

(Detailed Description of Japanese-to-English Translation Processing)

Figure 25:
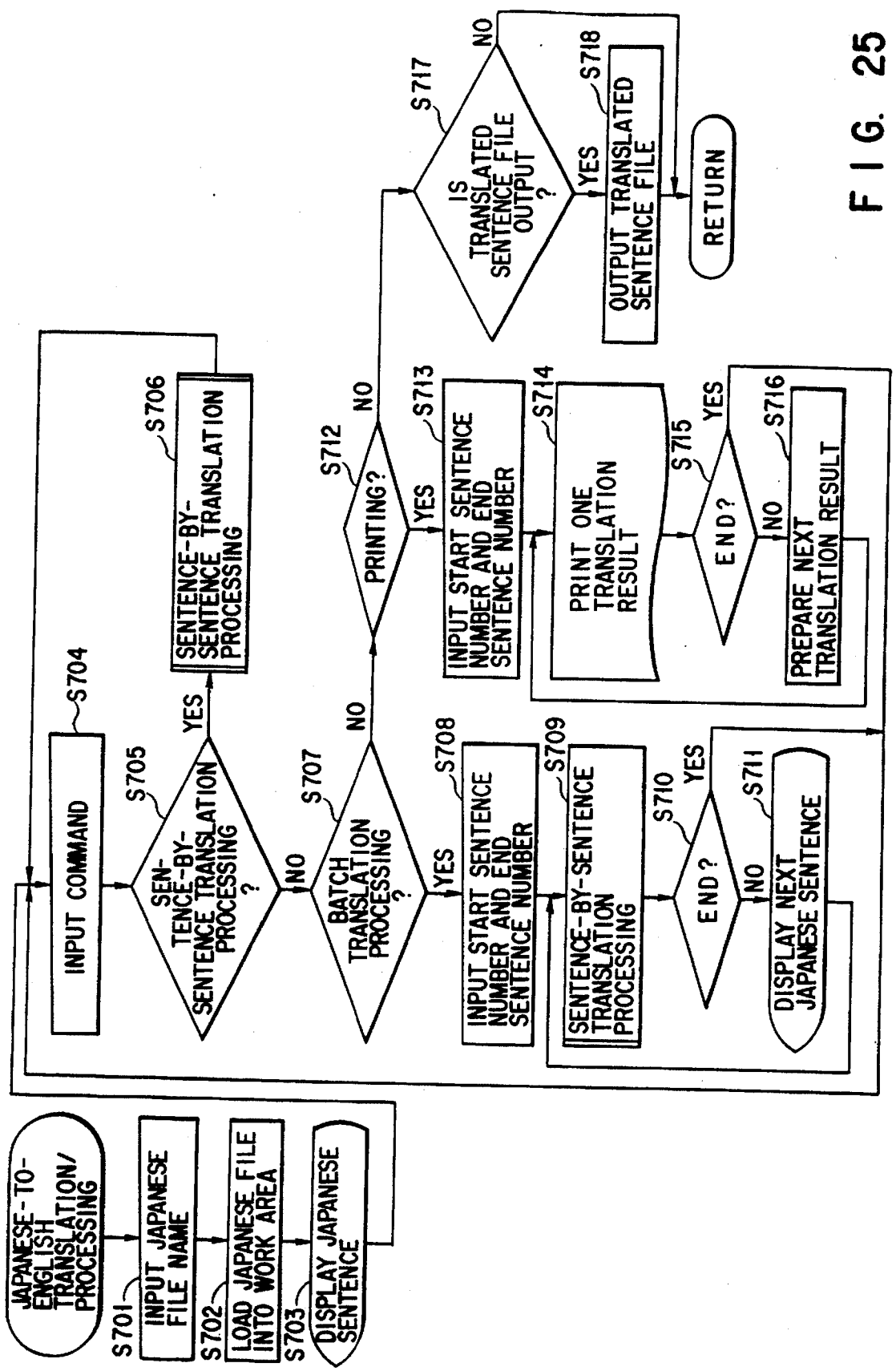
FIG. 25 is a flow chart explaining Japanese-to-English translation processing upon selection of Japanese-to-English translation in the flow chart shown in FIG. 19.

FIG. 25 is a flow chart showing the Japanese-to-English translation processing (step S206 in FIG. 19) in detail.

The Japanese-to-English translation processing shown in this flow chart is similar to the English-to-Japanese translation processing shown in the flow chart in FIG. 23.

The mainframe 2 receives a file name designated by the operator, i.e., a Japanese file name to be subjected to translation processing, via the input section 3 (step S701). The mainframe 2 loads a Japanese file corresponding to this Japanese file name into the work area of the internal memory (step S702), and displays the loaded Japanese file on the display section 4 (step S703).

The operator can designate either sentence-by-sentence translation or batch translation by referring to a screen displayed on the display section 4. The mainframe 2 receives a command from the operator (step S704), and determines in accordance with this input whether to perform sentence-by-sentence translation or batch translation. If original sentences are to be translated sentence by sentence (YES in step S705), one sentence is translated by the processing in step S706, and the processing in step S704 and the subsequent steps is repeated.

If the original sentences are to be translated altogether (YES in step S707), the Japanese-to-English translation section 222 receives a sentence number at which translation is started (translation start sentence number) and a sentence number at which translation is ended (translation end sentence number) designated by the operator (step S708). First of all, the Japanese-to-English translation section 222 translates one sentence at the translation start sentence number into Japanese (step S709). The Japanese-to-English translation section 222 then checks whether translation of a Japanese sentence at the translation end sentence number is completed (step S710). If the translation is completed (YES in step S710), the Japanese-to-English translation section 222 repeatedly executes the processing in step S704 and the subsequent steps. If the translation of the Japanese sentence at the translation end sentence number is not completed (NO in step S710), the Japanese-to-English translation section 222 displays the second Japanese sentence (step S711), and repeatedly executes the processing in step S709 and the subsequent steps. In this manner, a plurality of Japanese sentences from the translation start sentence number to the translation end sentence number can be translated into English sentences altogether.

If it is determined in step S707 that the command is a command for not performing batch translation (NO in step S707), it is checked whether the command is a command for printing the translation result (step S712). If the translation result is to be printed (YES in step S712), the Japanese-to-English translation printing section 224 receives a printing start sentence number and a printing end sentence number from the operator. The Japanese-to-English translation printing section 224 outputs the first translation result (Japanese and translated English sentences) at the printing start sentence number to the printer section 7. The printer section 7 prints the first translation result in a predetermined form (step S714). The Japanese-to-English translation printing section 224 continues to print translation results until printing of the translation result at the printing end sentence number is completed (YES in step S715). When printing of the translation result at the printing end sentence number is completed (YES in step S715), the processing in step S704 and the subsequent steps is executed.

If it is determined in step S712 that the command is not a printing command (NO in step S712), it is checked whether the command is a command for outputting the translated sentence to a file (step S717). If the translated sentence is to be output to the file (YES in step S717), the mainframe 2 outputs the translated sentence to the file, and the flow returns to the flow chart shown in FIG. 19.

Figure 26:
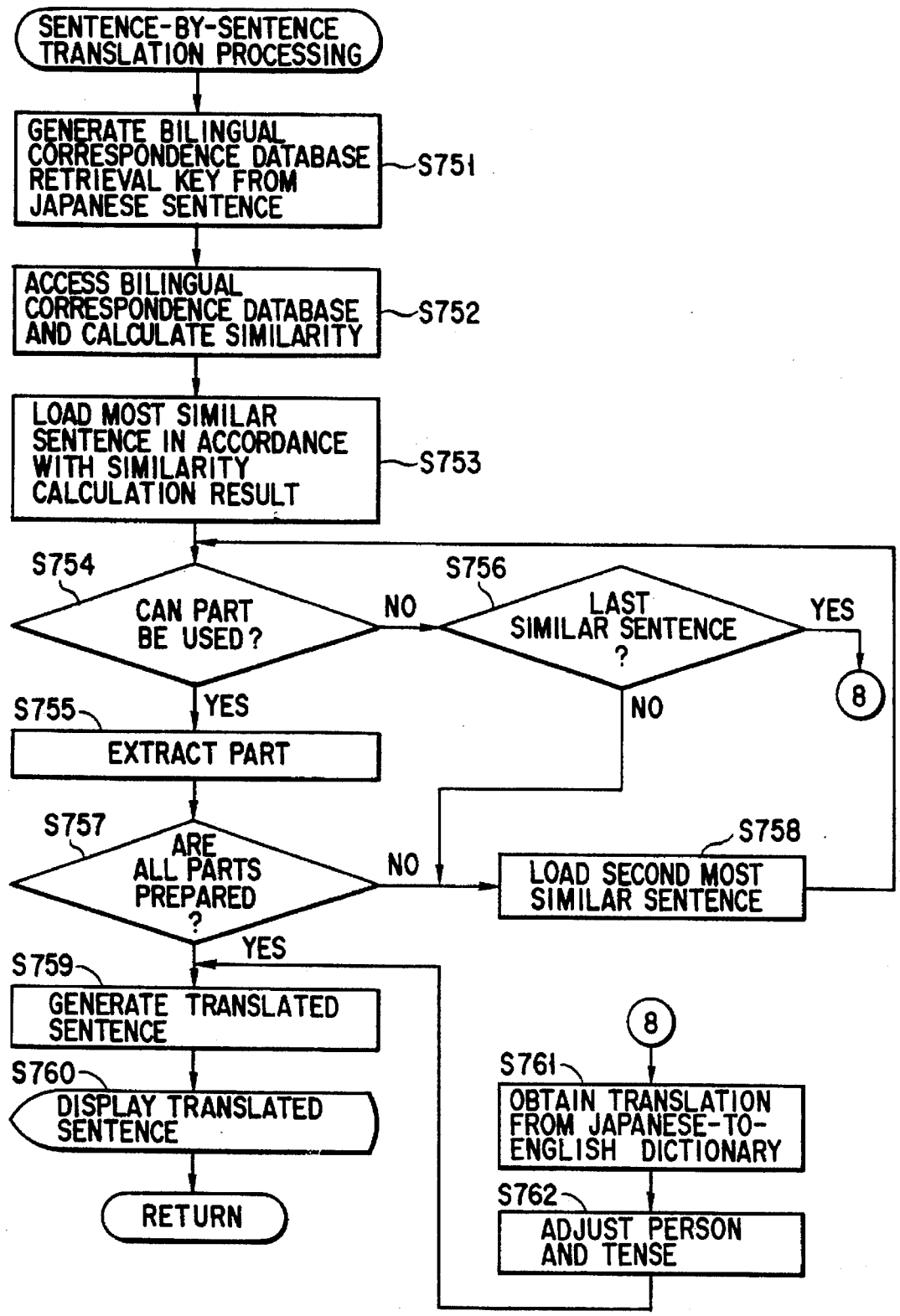
FIG. 26 is a flow chart showing detailed sentence-by-sentence translation processing in the flow chart shown FIG. 25.
Figure 27A:
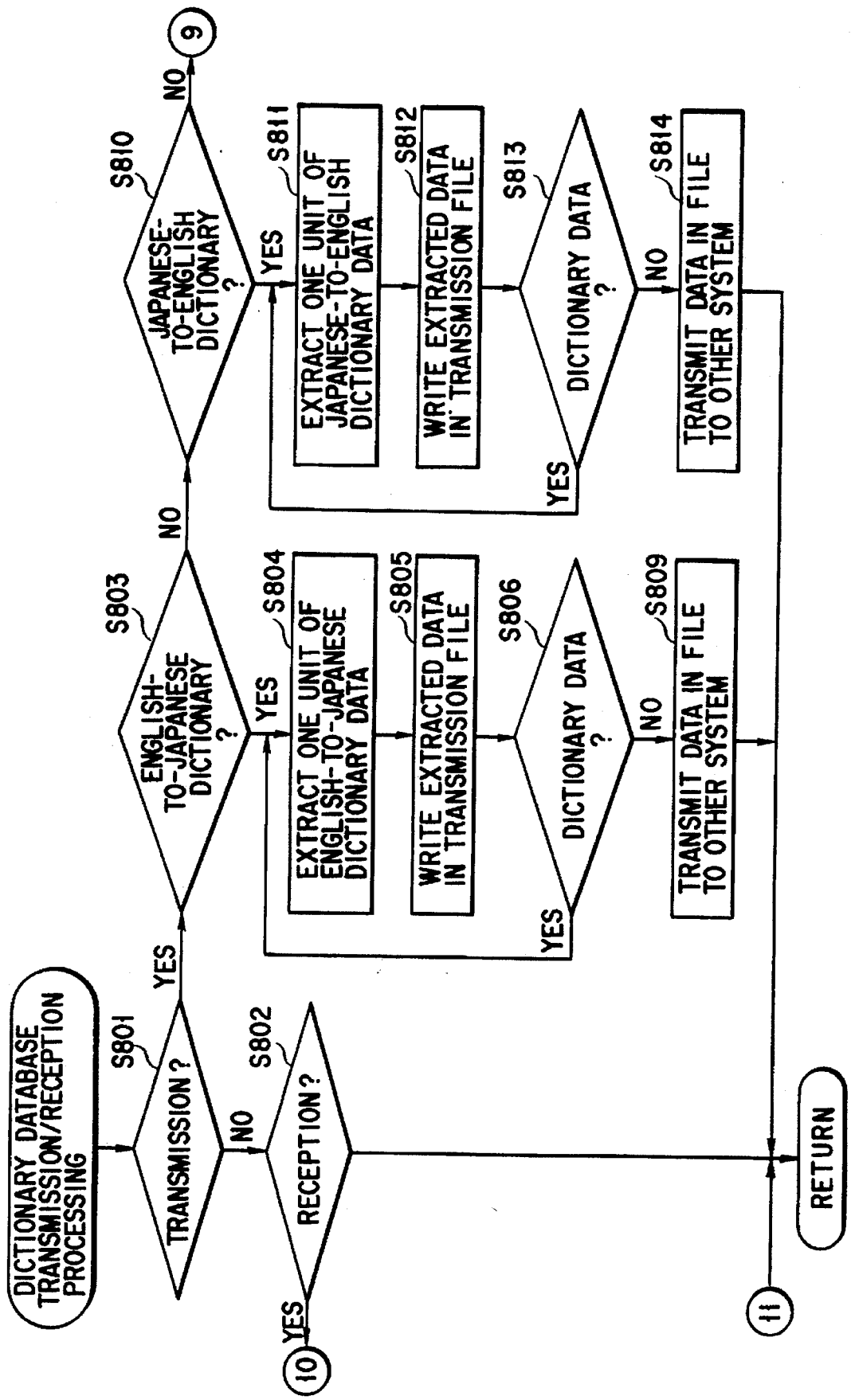
Figure 27B:
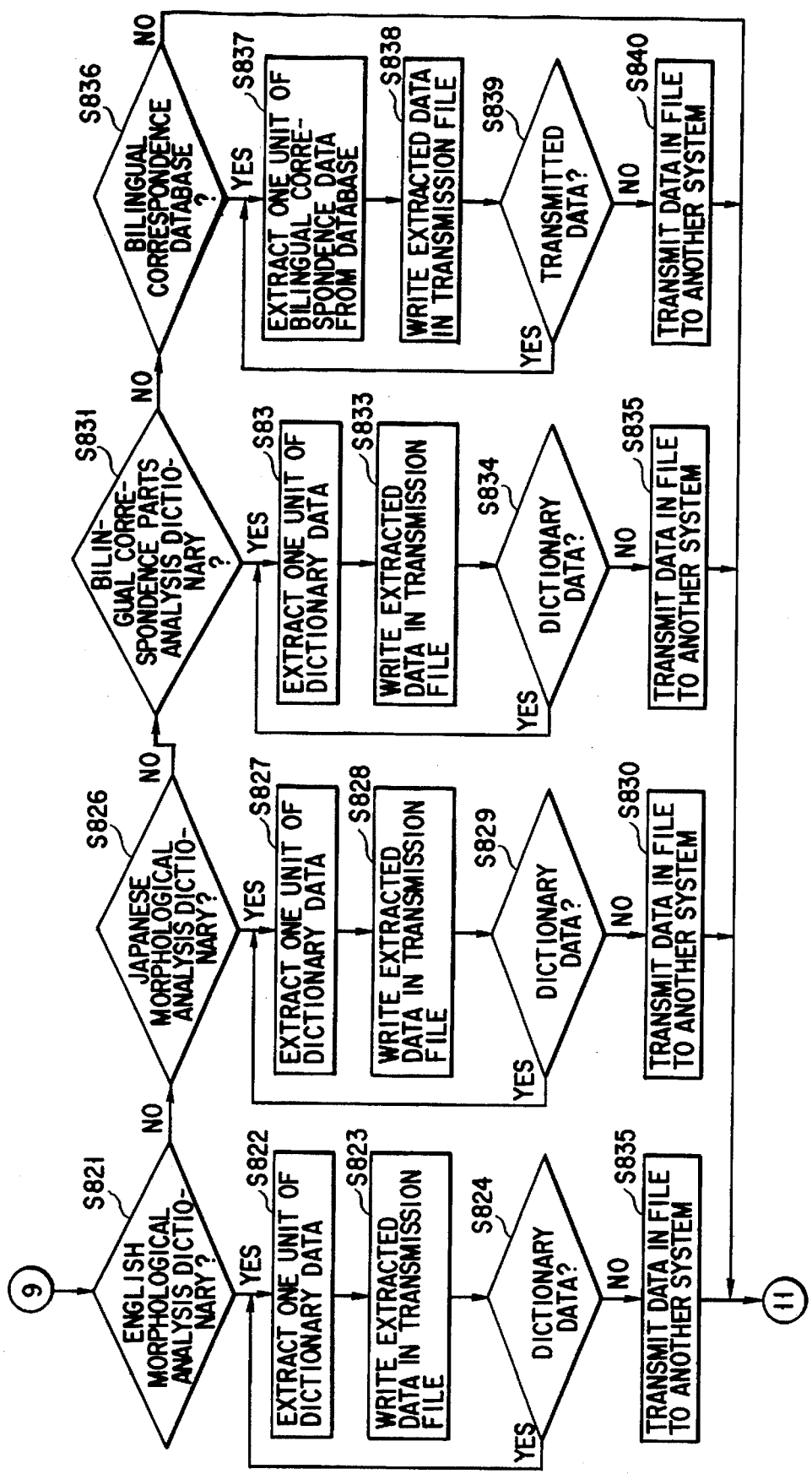
Figure 27D:
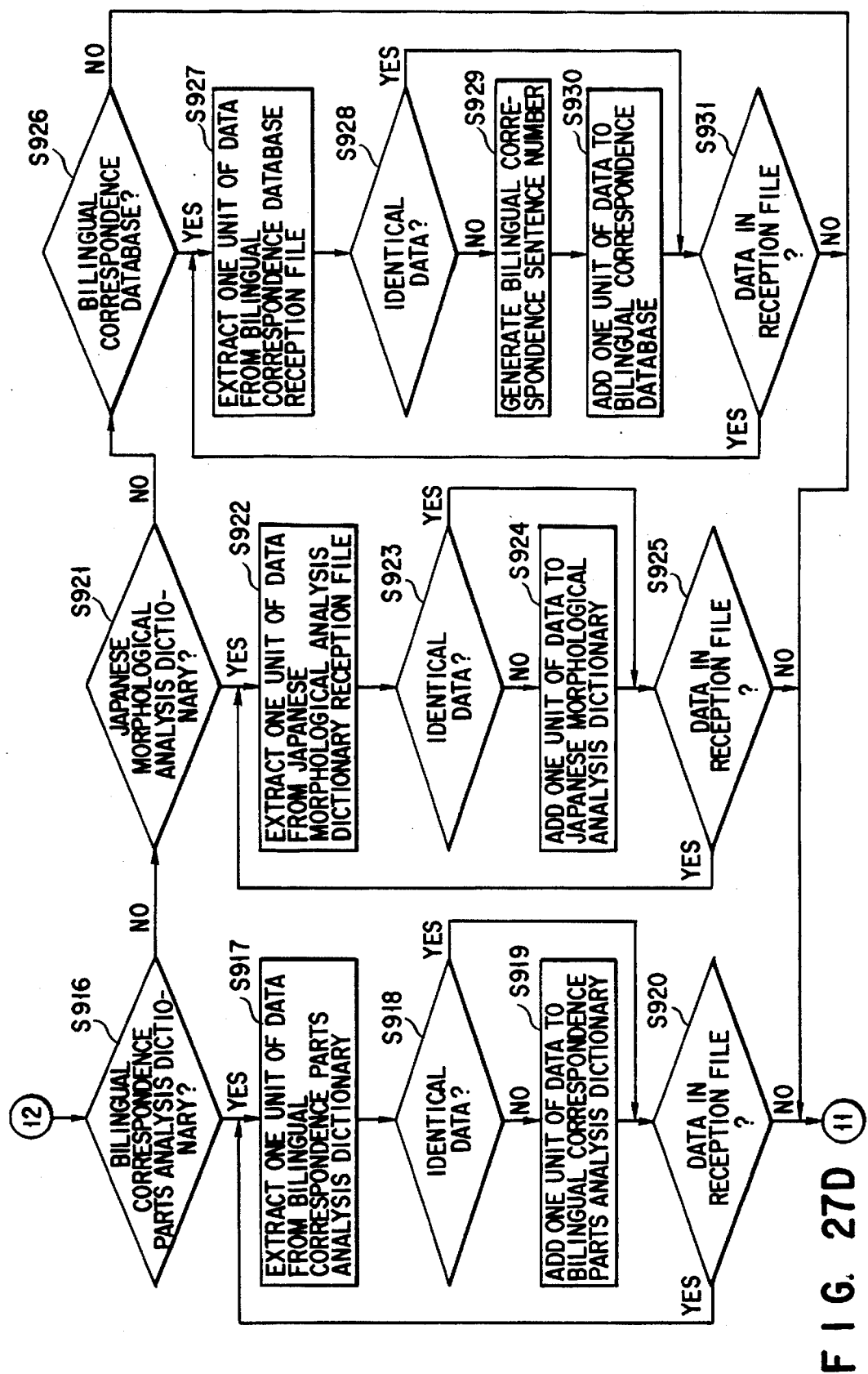

FIG. 26 is a flow chart showing sentence-by-sentence translation processing in steps S706 and S709 described above. This processing is the same as that described above and shown in FIG. 24. First of all, the Japanese-to-English translation section 222 generates key data for an original sentence supplied as a translation target (step S751). The Japanese-to-English translation section 222 retrieves bilingual correspondence data having a Japanese sentence which is most similar to the original sentence from the bilingual correspondence data in the bilingual correspondence database 56 in accordance with this key data (step S752), and reads out this bilingual correspondence data (step S753).

Assume that the original sentence 131 "<BONDYINGU SARERU BUBUNNI SAITEI 100 MAIKUROINCHI NO ATSUSADE GIN NIYORU BUBUNMEKKI GA HODO-KOSARETEIRUKOTO>" is supplied, as shown in FIG. 11. The Japanese-to-English translation section 222 retrieves a Japanese sentence which is most similar to the original sentence 131 from the bilingual correspondence database 56, and detects bilingual correspondence data 133. The Japanese-to-English translation section 222 checks parts of the bilingual correspondence data 133 which coincide with parts of the original sentence 131. That is, it is checked whether the bilingual correspondence data 133 includes parts which can be used for translation of the original sentence 131 (step S754). If the bilingual correspondence data 133 includes parts which can be used (YES in step S754), the parts are loaded into the work area of the internal memory (step S755). Note that the mark <****> is internally attached to each of the parts which cannot be used, i.e., [<150>], [<KEISOKUHOUHOUNIYORI>], [<KOUNO>], and [<6. 3. 1 NO>].

In this case, since all the parts of the original sentence 131 can be covered by parts constituting the bilingual correspondence data 133, the result is output as a translation result. Assume that all the parts of the original sentence 131 are not prepared (NO in step S757). In this case, the Japanese-to-English translation section 222 reads out bilingual correspondence data having a Japanese sentence which is second most similar to the original sentence 131 from the bilingual correspondence database 56 (step S758). The Japanese-to-English translation section 222 repeatedly executes the processing in step S754 and the subsequent steps to search for parts which can be used in the bilingual correspondence data. If all the bilingual correspondence data similar to the original sentence 131 are retrieved from the bilingual correspondence database 56 (YES in step S756), Japanese-to-English translation is performed on the basis of the Japanese-to-English dictionary 52 (step S761). In this case, the person, tense, and the like of the words retrieved from the Japanese-to-English dictionary 52 are matched with the original sentence 131 (step S762). The parts (words) retrieved in this manner are arranged in a predetermined order to complete a translated sentence 136 of the original sentence 131. The completed translated sentence 136 is displayed on the display section 4 (step S760). When the above processing is completed, the flow returns to the processing shown in FIG. 25.

(Detailed Description of Dictionary Database Transmission/Reception Processing)

FIGS. 27A to 27D are flow charts showing the transmission/reception processing with respect to the dictionary database section 5 (step S312 in FIG. 20) in detail.

When the dictionary database transmission/reception processing is selected, the operator can select either dictionary database transmission processing or reception processing by referring to a menu displayed on the display section 4. If the transmission processing is selected (YES in step S801), the dictionary database transmission and reception section 236 executes the processing in step S803 and the subsequent steps. If the reception processing is selected (YES in step S802), the dictionary database transmission and reception section 236 executes the processing in step S901 (FIG. 27C) and the subsequent steps.

■ Dictionary Database Transmission Processing

If the transmission processing is selected by the operator (YES in step S801), the operator can select desired processing from the dictionary database transmission main menu shown in FIG. 16. If English-to-Japanese dictionary transmission processing is selected by the operator (YES in step S803), the dictionary database transmission and reception section 236 extracts one unit of English-to-Japanese dictionary data from the English-to-Japanese dictionary 51 (step S804). Note that one unit of data in this case includes one word held in the English-to-Japanese dictionary 51 and all associated information such as the parts-of-speech information and the like of the word. The dictionary database transmission and reception section 236 writes the extracted data in a transmission file set in a predetermined memory area in advance (step S805). The processing in steps S804 and S805 is repeatedly executed until all the dictionary data are loaded from the English-to-Japanese dictionary 51 (NO in step S806). When all the dictionary data are loaded (NO in step S806), the dictionary database transmission and reception section 236 transmits the dictionary data in the transmission file to another work station via the communication system 8. With the above processing, the English-to-Japanese dictionary data transmission processing is completed, and the flow returns to the flow chart shown in FIG. 20.

If the Japanese-to-English dictionary transmission processing is selected by the operator (YES in step S810), the dictionary database transmission and reception section 236 extracts one unit of Japanese-to-English dictionary data from the Japanese-to-English dictionary 52 (step S811). The dictionary database transmission and reception section 236 writes the extracted data in the transmission file (step S812). In this manner, the processing in steps S811 and S812 is repeatedly executed until all the dictionary data are loaded from the Japanese-to-English dictionary 52 (NO in step S813). When all the dictionary data are loaded (NO in step S813), the dictionary database transmission and reception section 236 transmits the dictionary data in the transmission file to another work station via the communication system 8. With the above processing, the Japanese-to-English dictionary data transmission processing is completed, and the flow returns to the flow chart shown in FIG. 20.

If English morphological analysis dictionary transmission processing is selected by the operator (YES in step S821 in FIG. 27B), the dictionary database transmission and reception section 236 extracts data from the English morphological analysis dictionary 53 and writes it in the transmission file (steps S822 to S824). The dictionary database transmission and reception section 236 then transmits the dictionary data in the transmission file to another work station. With this processing, the English morphological analysis dictionary transmission processing is completed, and the flow returns to the flow chart shown in FIG. 20. Subsequently, transmission processing of the Japanese morphological analysis dictionary 54, the bilingual correspondence parts analysis dictionary 55, and the bilingual correspondence database 56 is executed in the same manner as described above. When data from the Japanese morphological analysis dictionary 54 is to be transmitted, the dictionary database transmission and reception section 236 executes the processing in steps S826 to S830. When data from the bilingual correspondence parts analysis dictionary 55 is to be transmitted, the dictionary database transmission and reception section 236 executes the processing in steps S831 to S835. When data from the bilingual correspondence database 56 is to be transmitted, the dictionary database transmission and reception section 236 executes the processing in steps S836 to S840. With the above processing, various data from the dictionary database section 5 can be transmitted to another work station.

■ Dictionary Database Reception Processing

When the reception processing is selected by the operator (YES in step S802), the operator can select desired processing from a predetermined dictionary database reception main menu. When English-to-Japanese dictionary reception processing is selected by the operator (YES in step S901), the dictionary database transmission and reception section 236 extracts one unit of dictionary data from an English-to-Japanese dictionary reception file (step S902), and checks whether the same data as the extracted dictionary data is present in the English-to-Japanese dictionary 51 held by the self-system (step S903). Note that dictionary data transmitted from another work station via the communication system 8 is stored in an English-to-Japanese dictionary file set in a predetermined memory area in advance. That is, received dictionary data is not reflected in the dictionary database section 5 used by the operator unless the dictionary database reception processing is selected by the operator. If the same dictionary data as the extracted dictionary data is not present in the English-to-Japanese dictionary 51 (NO in step S903), the dictionary database transmission and reception section 236 adds/records this dictionary data on the English-to-Japanese dictionary 51. If the same dictionary data as the extracted dictionary data is present in the English-to-Japanese dictionary 51 (YES in step S903), the dictionary database transmission and reception section 236 executes the processing in step S905 without adding the dictionary data (step S904).

In step S905, the dictionary database transmission and reception section 236 checks whether any dictionary data which has not undergone the determination processing in step S903 is left in the English-to-Japanese dictionary reception file. If dictionary data is left (YES in step S905), the dictionary database transmission and reception section 236 repeats the processing in steps S902 to S904. If all the dictionary data in the English-to-Japanese dictionary reception file have undergone the determination processing in step S903 (NO in step S905), the flow returns to the flow chart shown in FIG. 20 via the flow chart shown in FIG. 27A.

Subsequently, reception processing of the Japanese-to-English dictionary 52, the English morphological analysis dictionary 53, the Japanese morphological analysis dictionary 54, and the bilingual correspondence parts analysis dictionary 55 is executed in the same manner as described above. When reception processing of the Japanese-to-English dictionary 52 is to be performed, the processing in steps S906 to S910 is executed. When reception processing of the English morphological analysis dictionary 53 is to be performed, the processing in steps S911 to S915 is executed. When reception processing of the bilingual correspondence parts analysis dictionary 55 is to be performed, the processing in steps S916 to S920 is executed. When reception processing of the Japanese morphological analysis dictionary 54 is to be performed, the processing in steps S921 to S925 is executed.

When bilingual correspondence database reception processing is to be performed (YES in step S926), the processing in steps S927 to S931 is executed. First of all, assume that bilingual correspondence data and the like is transmitted from another work station to the self-work station via the communication system 8, and these data are stored in a bilingual correspondence database reception file. The dictionary database transmission and reception section 236 extracts one unit of data from the bilingual correspondence database reception file (step S927), and checks whether the same data as the extracted data is present in the bilingual correspondence database 56 (step S928). If the same data is not present in the bilingual correspondence database 56 (NO in step S928), the dictionary database transmission and reception section 236 generates a bilingual correspondence sentence number of this data (step S929). The dictionary database transmission and reception section 236 then adds/records the received data on the bilingual correspondence database 56, together with the bilingual correspondence sentence number (step S930).

If the same data as the received data is present in the bilingual correspondence database 56 (YES in step S928), the dictionary database transmission and reception section 236 executes the processing in step S931 without adding the data (steps S929 and S930). In step S931, the dictionary database transmission and reception section 236 checks whether any data which has not undergone the determination processing in step S928 is left in the bilingual correspondence database reception file. If such data is left (YES in step S931), the dictionary database transmission and reception section 236 repeats the processing in steps S927 to S930. If all the data in the bilingual correspondence database reception file have undergone the determination processing in step S928 (NO in step S931), the flow returns to the flow chart shown in FIG. 20 via the flow chart shown in FIG. 27A.

With the above processing, recorded dictionary data, bilingual correspondence data having undergone learning/recording processing, and the like in another work station can be received and added/recorded on the dictionary database section 5. With this operation, dictionary databases can be shared among a plurality of work stations (machine translation systems).

The present invention is not limited to the embodiment described above, and various changes and modifications can be made without departing from the scope and spirit of the invention. For example, a parallel processing type processor or the like may be used to retrieve data from a bilingual correspondence database. With this processor, retrieval can be performed within a short period of time, and the translation speed can be greatly increased. In addition, a large number of translation examples can be efficiently input by reading them using an OCR (optical character reader).

As has been described above, according to the present invention, the following effects can be obtained.

First, the translation ability can be improved in accordance with commands from the operator. That is, the machine translation system can be made to learn translation examples by performing bilingual correspondence data recording and bilingual correspondence learning (generation of parts link information). Therefore, by making the machine translation system learn desired translation examples, the user can improve the translation ability of the machine translation system. Especially, since the degree of freedom of commands from the operator is high, the machine translation system can flexibly cope with a command for an idiomatic expression or the like. Furthermore, since learning/recording processing can be automatically performed on the basis of past learning results (bilingual correspondence parts), the load of work on the operator in learning/recording processing can be reduced.

Second, according to the present invention, the translation quality can be improved without adding grammatical rules. Therefore, a deterioration in translation quality caused by interference between added grammatical rules can be prevented.

Third, natural translation can be realized. According to the present invention, since translation examples are obtained not from grammatical rules but from past translation examples, a natural translation can be output with respect to an idiomatic expression or the like which is inconsistent with grammatical rules. In addition, according to the present invention, unlike a general machine translation system using the EBMT scheme, the system of the present invention translates each part of an original sentence while comparing each part of the original sentence with each part of a translation example similar to the original sentence. With this operation, each part of the original sentence can be translated flexibly instead of strictly complying with grammatical rules. Therefore, a more natural translation can be output.

Additional advantages and modifications will readily occur to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

What is claimed is:

1. A machine translation system comprising:
   first input means for inputting a first character string written in a first language;
   second input means for inputting a second character string written in a second language;

display means for simultaneously displaying the first and second character strings input from said first and second input means;

linking means which has first designating means for designating a third character string included in the first character string displayed by said display means, and second designating means for designating a fourth character string included in the second character string displayed by said display means, and links the third and fourth character strings with each other;

recording means for recording the third and fourth character strings linked by said linking means as a pair; and means for detecting the character string which is most similar to an original character string written in the first language from a plurality of recorded third character strings, and translating the original character string into a character string written in the second language by using a fourth character string linked with the detected character string.

2. A system according to claim 1, wherein said display means includes means for marking the third and fourth character strings designated by said first and second designating means.

3. A system according to claim 1, further comprising:

a first dictionary for storing a group of words written in the first language;

a second dictionary for storing a group of words written in the second language;

first determining means for determining, in accordance with a designation from said first designating means, whether the third character string includes a word which is not recorded on said first dictionary; and second determining means for determining, in accordance with a designation from said second designating means, whether the fourth character string includes a word which is not recorded on said second dictionary, and wherein said display means includes means for displaying words determined as non-recorded words by said first and second determining means.

4. A system according to claim 1, wherein said recording means includes means for generating an identification number for each of the pairs, and recording the identification number together with the third and fourth character strings.

5. A system according to claim 1, wherein said first designating means includes means for designating a third character string including a plurality of sentences, and said second designating means includes means for designating a fourth character string including a plurality of sentences.

6. A system according to claim 1, wherein said first input means inputs the first character string from a first file of character strings written in the first language, and said second input means inputs the second character string from a second file of character strings written in the second language.

7. A system according to claim 1, wherein said first input means inputs the first character string from a third file constituted by character strings written in the first and second languages, and said second input means inputs the second character string from the third file.

8. A machine translation system comprising:

input means for inputting a first character string written in a first language, and a second character string obtained by translating the first character string into a second language;

generating means for generating parts link information indicating linking between first parts included in the first character string input by said input means and second parts included in the second character string input by said input means;

recording means for recording the parts link information generated by said generating means as dictionary information, together with the first and second parts; and translation means for translating an original character string written in the first language into a character string written in the second language by using the dictionary information.

9. A system according to claim 8, wherein said generating means generates the parts link information by using third prestored third parts constituting a third character string written in the first language and prestored fourth parts corresponding to the third parts and written in the second language.

10. A machine translation system comprising:

input means for inputting a first character string written in a first language, and a second character string obtained by translating the first character string into a second language;

parts analysis storage means for storing first parts constituting a character string written in the first language, and second parts corresponding to the first parts and written in the second language;

generating means for generating parts link information indicating linking between third parts constituting the first character string input by said input means and fourth parts constituting the second character string input by said input means on the basis of the first and second parts stored in said parts analysis storage means;

recording means for recording the parts link information generated by said generating means, and adding/recording parts of the third and fourth parts, which are not recorded on said parts analysis storage means, on said parts analysis storage means; and translation means for translating an original character string written in the first language into a character string written in the second language by using the parts link information.

11. A machine translation system comprising:

input means for inputting a first character string written in a first language, and a second character string obtained by translating the first character string into a second language;

parts analysis storage means for storing first parts constituting a character string written in the first language, and second parts corresponding to the first parts and written in the second language;

word storage means for storing a plurality of pairs of words, each pair being constituted by a word written in the first language and a word obtained by translating the word written in the first language into the second language;

generating means for generating parts link information indicating linking between third and fourth parts by using the first and second parts with respect to parts, of the third and fourth parts respectively constituting the first and second character strings input by said input means, which are stored in said parts analysis storage means, and using words stored in said word storage means with respect to parts, of the third and fourth parts, which are not recorded on said parts analysis storage means;

recording means for recording the parts link information generated by said generating means, and adding/recording parts of the third and fourth parts, which are not recorded on said parts analysis storage means, on said parts analysis storage means; and means for translating an original character string written in the first language into a character string written in the second language by using the parts link information.

12. A system according to claim 11, further comprising means for, when the third and fourth parts respectively included in the first and second character strings include parts which are not recorded on said parts analysis storage means, displaying the non-recorded parts.

13. A system according to claim 12, further comprising designating means for, when fifth and sixth parts which are not recorded on said parts analysis storage means and said word storage means are included in the third and fourth parts, designating linking between the fifth and sixth parts, and wherein said recording means includes means for recording the fifth and sixth parts linked by said designating means on said parts analysis storage means.

14. A machine translation system comprising:

storage means for storing a plurality of first character strings written in a first language, and a plurality of second character strings obtained by translating the plurality of first character strings into a second language;

detecting means for detecting a third character string which is most similar to an original character string written in the first language from the plurality of first character strings stored in said storage means; and translation means for determining whether each part constituting the original character string coincides with each part constituting the third character string, generating parts written in the second language with respect to the parts which coincide with each other by using a character string included in the plurality of second character strings and corresponding to the third character string, and translating the original character string into a character string of the second language by using the generated parts.

15. A system according to claim 14, wherein when the parts constituting the original character string include a part which does not coincide with the third character string, said translation means repeatedly operates means for detecting another character string similar to the original character string from the plurality of first character strings, determining whether each part constituting the original character string coincides with each part constituting the detected character string, and generating a part written in the second language, with respect to parts which coincide with each other, by using a character string included in the plurality of second character strings and corresponding to the other detected character string, until one of conditions that parts written in the second language are generated with respect to all the parts constituting the original character string and all the first character strings are detected is satisfied.

16. A system according to claim 15, wherein said translation means detects character strings from the plurality of first character strings in the order of decreasing similarity with respect to the original character string.

17. A system according to claim 15, further comprising word storage means for storing a plurality of pairs of words, each pair consisting of a word written in the first language and a word obtained by translating the word written in the first language into the second language; and wherein when the parts constituting the original character string include a first part which is not included in any of the plurality of first character strings, said translation means generates a part written in the second language with respect to the first part on the basis of the words stored in said word storage means.

18. A machine translation system comprising:

transmission means for transmitting information; and a plurality of terminals, each of said plurality of terminals including storage means for storing bilingual correspondence information including a plurality of first character strings written in a first language and a plurality of second character strings obtained by translating the first character strings into a second language, means for detecting a third character string which is most similar to an original character string written in the first language from the plurality of first character strings, and translating the original character string into a character string written in the second language by using a character string corresponding to the detected third character string and included in the plurality of second character strings, and transmission and reception means for transmitting/receiving bilingual correspondence information stored in said storage means to/from another terminal via said transmission means.

19. A system according to claim 18, wherein said transmission and reception means includes means for adding/recording only non-recorded information, of received bilingual correspondence information, on said storage means.

20. A system according to claim 18, wherein the bilingual correspondence information includes parts link information for linking parts constituting the first character string and parts constituting the second character string.

21. A system according to claim 18, wherein the bilingual correspondence information includes dictionary information having a plurality of pairs of words, each pair consisting of a word written in the first language and a corresponding word written in the second language.

* * * * *